(12) United States Patent
Watabe et al.

(10) Patent No.: US 7,457,080 B2
(45) Date of Patent: Nov. 25, 2008

(54) PERPENDICULAR MAGNETIC RECORDING HEAD, METHOD OF MANUFACTURING THE SAME, AND MAGNETIC RECORDING APPARATUS

(75) Inventors: Yuichi Watabe, Tokyo (JP); Susumu Aoki, Tokyo (JP); Reiichi Kurumisawa, Tokyo (JP); Yasuyuki Notsuke, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 414 days.

(21) Appl. No.: 11/264,171

(22) Filed: Nov. 2, 2005

(65) Prior Publication Data

US 2006/0098338 A1    May 11, 2006

(30) Foreign Application Priority Data

| Nov. 5, 2004 | (JP) | ............................. 2004-322820 |
| Oct. 28, 2005 | (JP) | ............................. 2005-315189 |

(51) Int. Cl.
*G11B 5/147* (2006.01)

(52) U.S. Cl. ..................................................... 360/126
(58) Field of Classification Search .................. 360/126
See application file for complete search history.

(56) References Cited

U.S. PATENT DOCUMENTS

| 4,843,507 | A | * | 6/1989 | Schewe et al. | ........... 360/123.03 |
| 6,687,084 | B2 | | 2/2004 | Takahashi et al. | |
| 6,903,900 | B2 | * | 6/2005 | Sato et al. | .............. 360/125.12 |
| 7,181,827 | B2 | * | 2/2007 | Kamijima | ................ 29/603.07 |
| 7,196,871 | B2 | * | 3/2007 | Hsu et al. | .............. 360/125.03 |
| 7,245,454 | B2 | * | 7/2007 | Aoki et al. | ................ 360/125.1 |
| 7,253,992 | B2 | * | 8/2007 | Chen et al. | ............. 360/125.03 |
| 7,296,338 | B2 | * | 11/2007 | Le et al. | .................. 29/603.16 |
| 2003/0193744 | A1 | | 10/2003 | Takahashi et al. | |
| 2005/0068669 | A1 | * | 3/2005 | Hsu et al. | ..................... 360/125 |
| 2006/0002021 | A1 | * | 1/2006 | Li et al. | ....................... 360/126 |
| 2006/0092575 | A1 | * | 5/2006 | Mochizuki et al. | .......... 360/317 |

FOREIGN PATENT DOCUMENTS

| EP | 0 360 978 A2 | 4/1990 |
| JP | A-02-066710 | 3/1990 |
| JP | A-2001-236605 | 8/2001 |
| JP | A-2001-250204 | 9/2001 |
| JP | A-2002-197615 | 7/2002 |
| JP | A-2002-208114 | 7/2002 |

* cited by examiner

*Primary Examiner*—Mark Blouin
(74) *Attorney, Agent, or Firm*—Oliff & Berridge, PLC

(57) ABSTRACT

A perpendicular magnetic recording head capable of minimizing the possibility of erasing recorded information without intention at the time of recording information is provided. A pole layer has a structure in which a main pole layer disposed on a leading side and an auxiliary pole layer disposed on a trailing side are laminated. Even if a part of a magnetic flux contained in the auxiliary pole layer is directly emitted from an air bearing surface to outside not via the main pole layer, as the magnetic flux is contained in the magnetic layer, the magnetic flux is not easily emitted from the air bearing surface to the outside directly. Therefore, an unnecessary perpendicular magnetic field is not easily generated by the magnetic flux. Thereby, a recording medium is not easily magnetized again by the unnecessary magnetic field, so information recorded on the recording medium is not easily erased without intention.

16 Claims, 22 Drawing Sheets

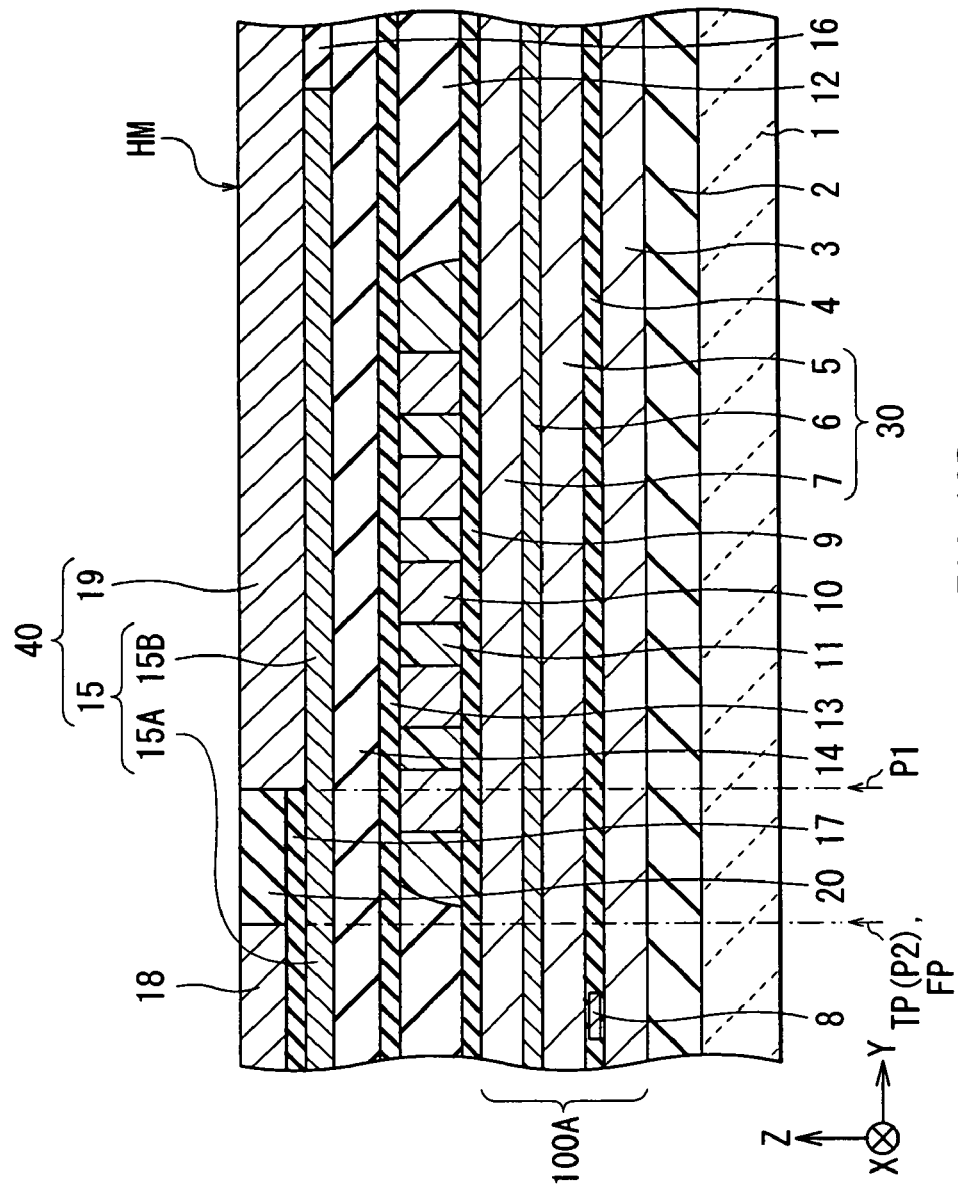
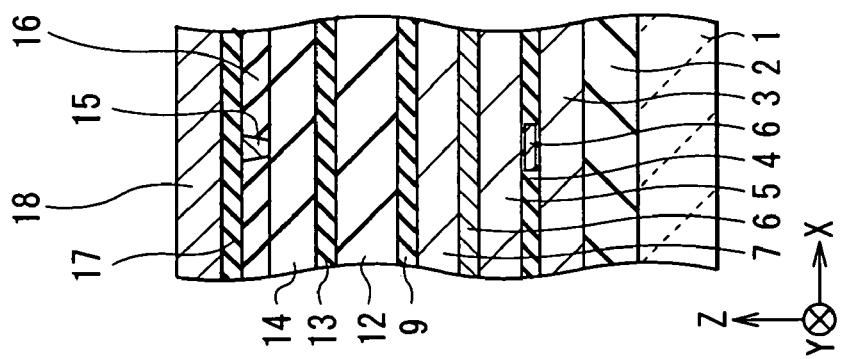
FIG. 10B
FIG. 10A

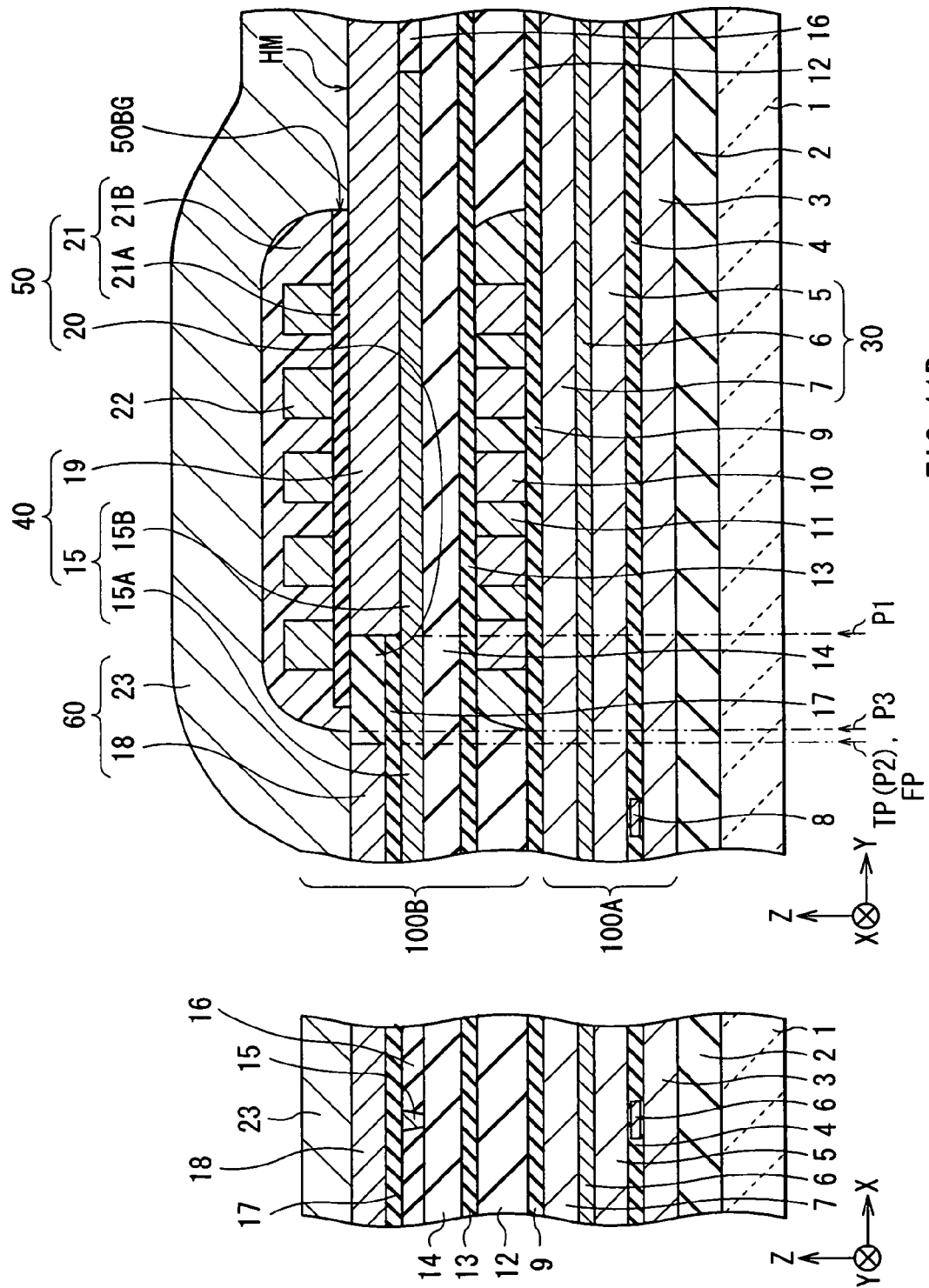

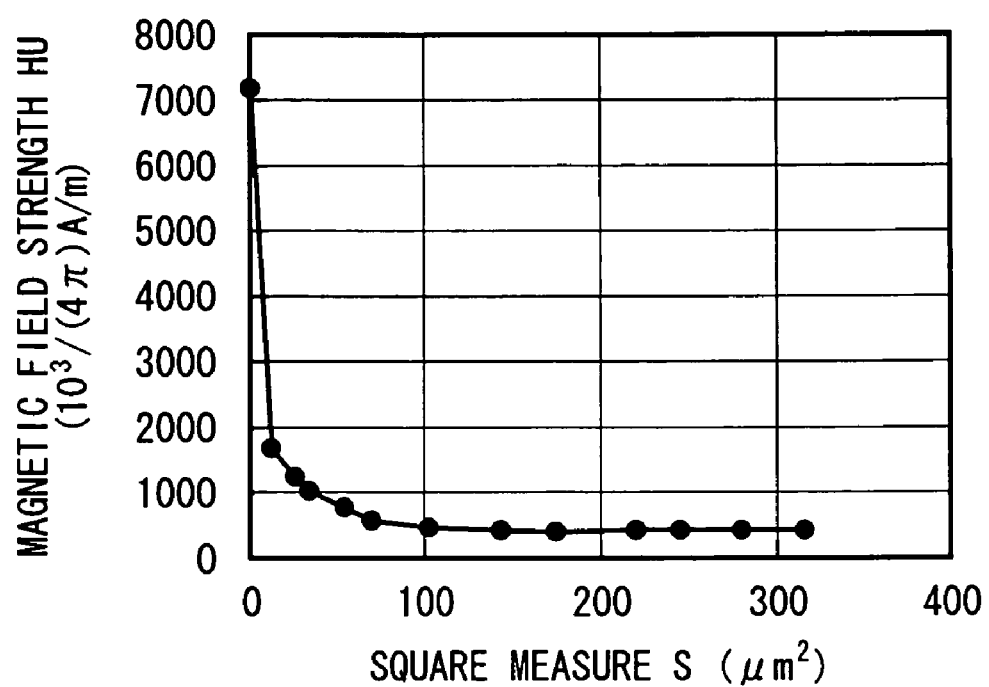
F I G. 30

PERPENDICULAR MAGNETIC RECORDING HEAD, METHOD OF MANUFACTURING THE SAME, AND MAGNETIC RECORDING APPARATUS

BACKGROUND OF THE INVENTION

1. Field of the Invention

The present invention relates to a perpendicular magnetic recording head including at least an inductive magnetic transducer for recording, and a method of manufacturing the perpendicular magnetic recording head, and a magnetic recording apparatus including a perpendicular magnetic recording head.

2. Description of the Related Art

In recent years, an improvement in performance of a thin film magnetic head which is included in a magnetic recording apparatus such as a hard disk drive has been sought in accordance with an increase in the areal density of a magnetic recording medium (hereinafter simply referred to as "recording medium") such as a hard disk. As recording systems of the thin film magnetic head, for example, a longitudinal recording system in which a signal magnetic field is oriented in an in-plane direction (a longitudinal direction) of a recoding medium and a perpendicular recording system in which a signal magnetic field is oriented in a direction orthogonal to a surface of the recording medium are well known. At present, the longitudinal recording system is widely used, but in consideration of market forces in accordance with an improvement in areal density, it is assumed that the perpendicular recording system instead of the longitudinal recording system holds promise for the future, because the perpendicular recording system can obtain advantages that higher linear recording density can be achieved and that a recording medium on which information is recorded is not easily affected by thermal decay.

The perpendicular recording system thin film magnetic head (hereinafter simply referred to as "perpendicular magnetic recording head) includes, for example, a thin film coil generating a magnetic flux for recording, and a main pole layer extending from an air bearing surface to the rear and guiding the magnetic flux to a recording medium so that the recording medium is magnetized in a direction orthogonal to a surface of the recording medium. In the perpendicular magnetic recording head, the recording medium is magnetized by a magnetic field for recording (a perpendicular magnetic field), so information is magnetically recorded on the recording medium.

As the perpendicular magnetic recording head, for example, a perpendicular magnetic recording head including a main pole layer disposed so as to extend in a direction orthogonal to the air bearing surface is known. The perpendicular magnetic recording head of this kind is generally called "single pole type head". As a specific structure of the single pole type head, for example, a structure in which an auxiliary pole layer for containing an auxiliary magnetic flux is connected to a main pole layer in order to improve overwrite characteristics through increasing the strength of a perpendicular magnetic field is known (for example, refer to Japanese Unexamined Patent Application Publication Nos. H02-066710 and 2002-197615). However, as described above, the single pole type head has an advantage that the overwrite characteristics can be improved, and on the other hand, it is said that the single pole type head has a limit to improving the recording density of the recording medium.

Therefore, as a recent perpendicular magnetic recording head, for example, in order to improve the recording density of the recording medium through preventing the expansion of a recording track width, a perpendicular magnetic recording head including a main pole layer extending in a direction orthogonal to the air bearing surface as described above and a write shield layer preventing the spread of the magnetic flux emitted from the main pole layer is becoming a mainstream. The perpendicular magnetic recording head of this kind is generally called "shield type head". The write shield layer extends from the air bearing surface to the rear so as to be separated from the main pole layer by a gap layer on a side closer to the air bearing surface. As a specific structure of the shield type head, for example, a structure in which a write shield layer is disposed on a trailing side of a main pole layer is known (for example, refer to Japanese Unexamined Patent Application No. 2001-250204 and EP Patent Application No. 0360978). In a shield type head including the write shield layer, the gradient of a perpendicular magnetic field becomes steeper through preventing the spread of the magnetic flux emitted from the main pole layer, so the recording density of the recording medium can be improved.

In order to secure recording characteristics of the shield type head, for example, in order to stably execute a recording operation, it is necessary to sequentially record new information on the recording medium while maintaining information already recorded on the recording medium. However, in a shield type head in a related art, there is a problem that information recorded on the recording medium may be erased without intention at the time of recording information mainly because of a structural factor that the auxiliary pole layer is connected to the main pole layer. More specifically, in the shield type head in the related art, when a magnetic flux contained in the auxiliary pole layer does not pass through the main pole layer, and is directly emitted from the air bearing surface to outside, an unnecessary magnetic field is generated on the basis of the magnetic flux, so due to the unnecessary magnetic field, information recorded on the recording medium is erased without intention. Therefore, in order to secure the recording performance of the shield type head, even in the case where the auxiliary pole layer is connected to the main pole layer, it is desired to establish a technique for minimizing the possibility of erasing information recorded on the recording medium without intention. In this case, in particular, it is important to secure the strength of a perpendicular magnetic field while preventing information erasing without intention.

SUMMARY OF THE INVENTION

In view of the foregoing, it is desirable to provide a perpendicular magnetic recording head capable of preventing recorded information from being erased without intention at the time of recording information, a method of manufacturing the perpendicular magnetic recording head, and a magnetic recording apparatus.

According to an embodiment of the present invention, there is provided a perpendicular magnetic recording head including a thin film coil generating a magnetic flux; a pole layer extending from an air bearing surface facing a recording medium to the rear, and guiding the magnetic flux to the recording medium so that the recording medium is magnetized in a direction orthogonal to a surface of the recording medium; and a magnetic layer extending from the air bearing surface to the rear on a trailing side of the pole layer, the magnetic layer being separated from the pole layer by a gap layer on a side closer to the air bearing surface, and being connected to the pole layer on a side farther from the air bearing surface, wherein the pole layer includes: a main pole layer extending from the air bearing surface to the rear on a leading side; and an auxiliary pole layer extending from a position at the rear of the air bearing surface to the rear on a trailing side, and in the pole layer, the main pole layer and the auxiliary pole layer are laminated.

In the perpendicular magnetic recording head according to the embodiment of the invention, in the case where the magnetic layer is disposed on a trailing side of the pole layer, the pole layer has a structure in which the main pole layer disposed on a leading side and the auxiliary pole layer disposed on a trailing side are laminated, that is, the auxiliary pole layer is disposed on a side closer to the magnetic layer. In this case, unlike the case where the pole layer has a structure in which the auxiliary pole layer disposed on a leading side and the main pole layer disposed on a trailing side are laminated, that is, the auxiliary pole layer is disposed on a side farther from the magnetic layer, even if a part of a magnetic flux contained in the auxiliary pole layer is directly emitted from the air bearing surface to outside not via the main pole layer, the part of the magnetic flux is contained in the magnetic layer, so the magnetic flux is not easily emitted from the air bearing surface to outside directly. Therefore, an unnecessary magnetic field is not easily generated by the part of the magnetic flux. Thereby, the recording medium is not magnetized again by the unnecessary magnetic field, so information recorded on the recording medium is not easily erased without intention. Therefore, the possibility of erasing information recorded on the recording medium without intention at the time of recording information can be minimized.

According to another embodiment of the invention, there is provided a perpendicular magnetic recording head including a thin film coil generating a magnetic flux; a pole layer extending from an air bearing surface facing a recording medium to the rear, and guiding the magnetic flux to the recording medium so that the recording medium is magnetized in a direction orthogonal to a surface of the recording medium; and a return yoke layer extending from the air bearing surface to the rear on a trailing side of the pole layer, and being connected to the pole layer on a side further from the air bearing surface; and a write shield layer disposed in a region close to the air bearing surface between the pole layer and the return yoke layer so as to be separated from the pole layer by the gap layer, wherein the pole layer includes: a main pole layer extending from the air bearing surface to the rear on a leading side; and an auxiliary pole layer extending from a position at the rear of the air bearing surface to the rear on a trailing side, and in the pole layer, the main pole layer and the auxiliary pole layer are laminated.

In the perpendicular magnetic recording head according to another embodiment of the invention, in the case where the return yoke layer is disposed on a trailing side of the pole layer, and the write shield layer is disposed between the pole layer and the return yoke layer, the pole layer has a structure in which the main pole layer disposed on a leading side and the auxiliary pole layer disposed on a trailing side are laminated. In this case, as described above, the recording medium is not easily magnetized again by an unnecessary magnetic field, so information recorded on the recording medium is not easily erased without intention. Therefore, the possibility of erasing information recorded on the recording medium without intention at the time of recording information can be minimized.

According to an embodiment of the present invention, there is provided a method of manufacturing a perpendicular magnetic recording head, the thin film magnetic head including thin film coil generating a magnetic flux; a pole layer extending from an air bearing surface facing a recording medium to the rear, and guiding the magnetic flux to the recording medium so that the recording medium is magnetized in a direction orthogonal to a surface of the recording medium; and a magnetic layer extending from the air bearing surface to the rear on a trailing side of the pole layer, the magnetic layer being separated from the pole layer by a gap layer on a side closer to the air bearing surface, and being connected to the pole layer on a side farther from the air bearing surface, wherein a step of forming the pole layer includes: a first step of pattern-forming a main pole layer as a part of the pole layer so as to extend from the air bearing surface to the rear on a leading side; and a second step of pattern-forming an auxiliary pole layer as another part of the pole layer on the main pole layer so as to extend from a position at the rear of the air bearing surface to the rear on a trailing side, thereby forming the pole layer so that the main pole layer and the auxiliary pole layer are laminated.

In the method of manufacturing a perpendicular magnetic recording head according to the embodiment of the invention, the perpendicular magnetic recording head including the pole layer in which the main pole layer disposed on a leading side and the auxiliary pole layer disposed on a trailing side are laminated is manufactured only by existing thin film processes, and a novel and complicated manufacturing process is not used. Therefore, the perpendicular magnetic recording head capable of minimizing the possibility of erasing information recorded on the recording medium without intention at the time of recording information can be easily manufactured through the use of only existing thin film processes.

According to an embodiment of the present invention, there is provided a magnetic recording apparatus including a recording medium; and a perpendicular magnetic recording head recording information on the recording medium, wherein the perpendicular magnetic recording head includes: thin film coil generating a magnetic flux; a pole layer extending from an air bearing surface facing a recording medium to the rear, and guiding the magnetic flux to the recording medium so that the recording medium is magnetized in a direction orthogonal to a surface of the recording medium; and a magnetic layer extending from the air bearing surface to the rear on a trailing side of the pole layer, the magnetic layer being separated from the pole layer by a gap layer on a side closer to the air bearing surface, and being connected to the pole layer on a side farther from the air bearing surface, and the pole layer includes: a main pole layer extending from the air bearing surface to the rear on a leading side; and an auxiliary pole layer extending from a position at the rear of the air bearing surface to the rear on a trailing side, and in the pole layer, the main pole layer and the auxiliary pole layer are laminated.

In the magnetic recording apparatus according to the embodiment of the invention, the above-described perpendicular magnetic recording head is included, so information recorded on the recording medium is not easily erased without intention. Therefore, the possibility of erasing information recorded on the recording medium without intention at the time of recording information can be minimized.

In the perpendicular magnetic recording head according to the embodiment of the invention, it is preferable that the saturated magnetic flux density of the auxiliary pole layer is smaller than the saturated magnetic flux density of the main pole layer, and a distance from the air bearing surface to the auxiliary pole layer is within a range from 0.8 µm to 7.1 µm. In this case, the thickness of the gap layer may be within a range from 0.03 µm to 0.1 µm, and an exposed surface of the main pole layer exposed to the air bearing surface may have a trapezoidal shape in which a long side positioned on a trailing side and a short side on a leading side are an upper base and a lower base, respectively.

Moreover, in the perpendicular magnetic recording head according to the embodiment of the invention, the magnetic layer may include a first magnetic layer portion being separated from the pole layer by the gap layer, and extending from the air bearing surface to a position in front of the auxiliary pole layer, and a second magnetic layer portion extending from the air bearing surface to the rear on a trailing side of the first magnetic layer portion, the second magnetic layer portion being connected to the first magnetic layer portion on a side closer to the air bearing surface and being connected to the pole layer on a side farther from the air bearing surface. In this case, a surface of the first magnetic layer portion on a trailing side and a surface of the auxiliary pole layer on a trailing side may be in the same plane. Further, the perpendicular magnetic recording head according to the embodiment of the invention may further include an insulating layer covering the thin film coil, wherein the insulating layer includes a first insulating portion being disposed between the first magnetic layer portion and the auxiliary pole layer, and determining a throat height in a position adjacent to the first magnetic layer portion, and a second insulating layer portion being disposed on a trailing side of the first insulating layer portion so as to cover the thin film coil. In this case, the second insulating layer portion is preferably positioned in the rear of the first insulating layer portion.

In the perpendicular magnetic recording head according to the embodiment of the invention, the maximum width of the exposed surface exposed to the air bearing surface of the magnetic layer in a recording track width direction is preferably larger than the maximum width of the exposed surface exposed to the air bearing surface of the main pole layer in a recording track width direction. In this case, it is preferable that the width of the exposed surface exposed to the air bearing surface of the main pole layer in a recording track width direction on a trailing side is 0.2 μm or less, and the square measure of the exposed surface exposed to the air bearing surface of the magnetic layer is 7 μm$^2$ or more. In particular, a relationship of $Y \geq \{7X/[9000 \times 10^3/(4\pi)]\} \times Z$ is preferably established, where the saturated magnetic flux density of the magnetic layer is X [T (tesla)], the magnetic square measure of the exposed surface exposed to the air bearing surface of the magnetic layer is Y [μm$^2$T], and the maximum value of the strength of a magnetic field magnetizing the recording medium is Z [×10$^3$/(4π)A/m]. In this case, "the magnetic square measure" is represented by the square measure of the exposed surface of the magnetic layer [μm$^2$]× the saturated magnetic flux density of the magnetic layer [T].

In the perpendicular magnetic recording head according to another embodiment of the invention, the write shield layer may be exposed to the air bearing surface, and may be connected to the return yoke layer.

In the magnetic recording apparatus according to the embodiment of the invention, the recording medium preferably includes a magnetized layer and a soft magnetic layer which are laminated.

Other and further objects, features and advantages of the invention will appear more fully from the following description.

BRIEF DESCRIPTION OF THE DRAWINGS

FIGS. 10A and 10B are sectional views for describing a step following the step of FIGS. 9A and 9B;

FIGS. 11A and 11B are sectional views for describing a step following the step of FIGS. 10A and 10B;

FIG. 30 is a plot showing a correlation between the strength of the unnecessary magnetic field and the square measure of the exposed surface of the magnetic layer.

DETAILED DESCRIPTION OF THE PREFERRED EMBODIMENTS

A preferred embodiment will be described in detail below referring to the accompanying drawings.

Figure 1:
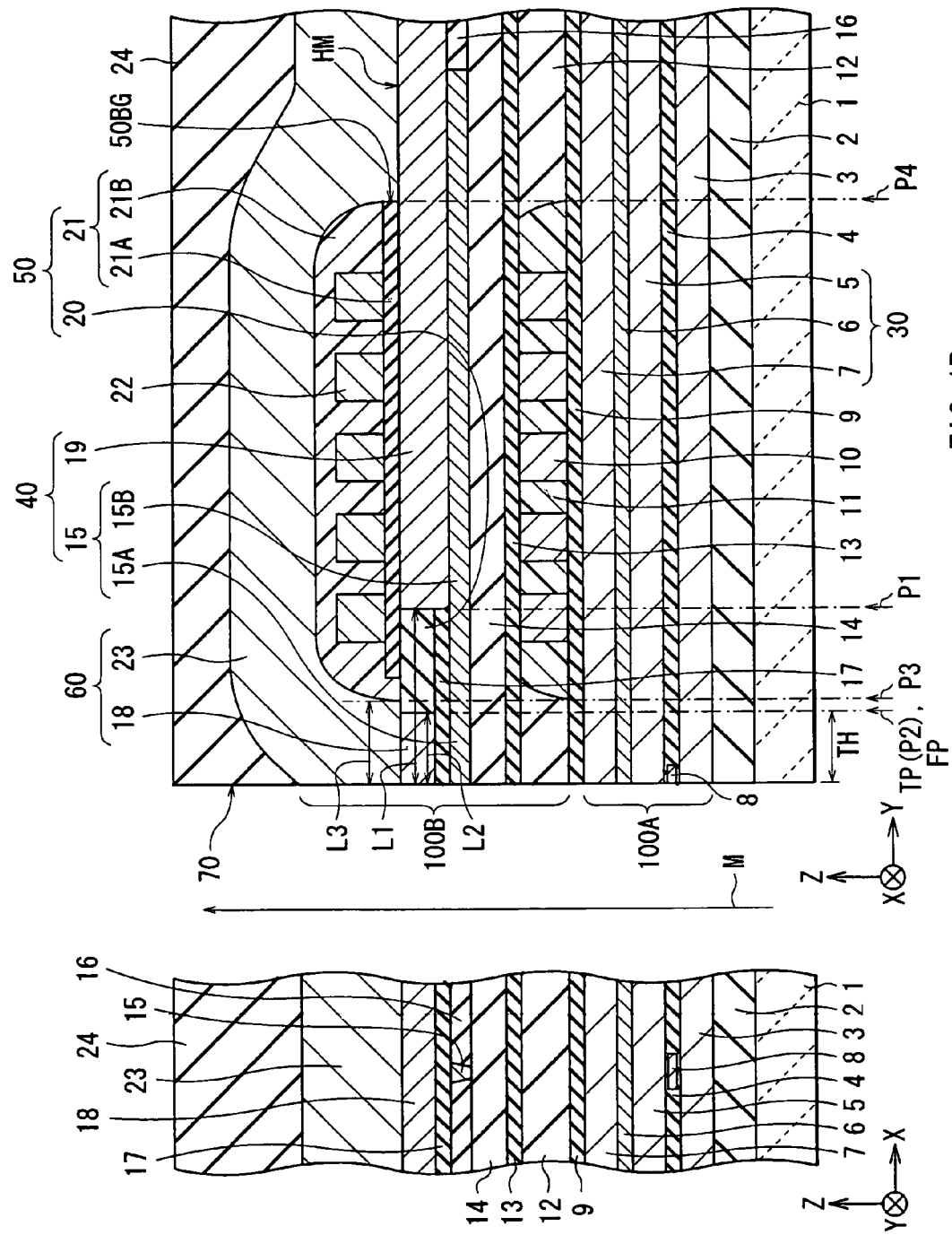
FIGS. 1A and 1B are sectional views of a thin film magnetic head including a perpendicular magnetic recording head according to an embodiment of the invention.
Figure 2:
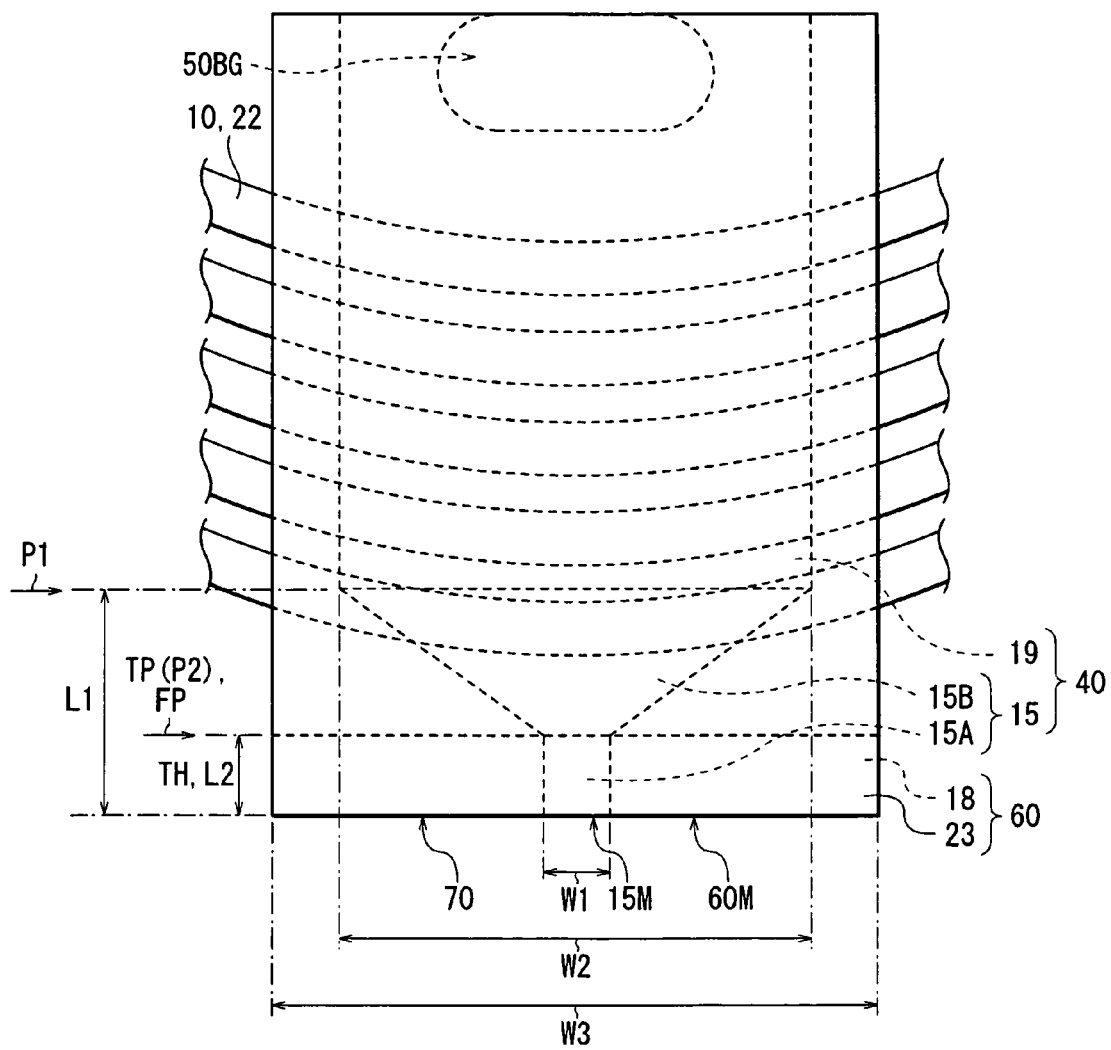
FIG. 2 is a plan view of a main part of the thin film magnetic head shown in FIGS. 1A and 1B.
Figure 3:
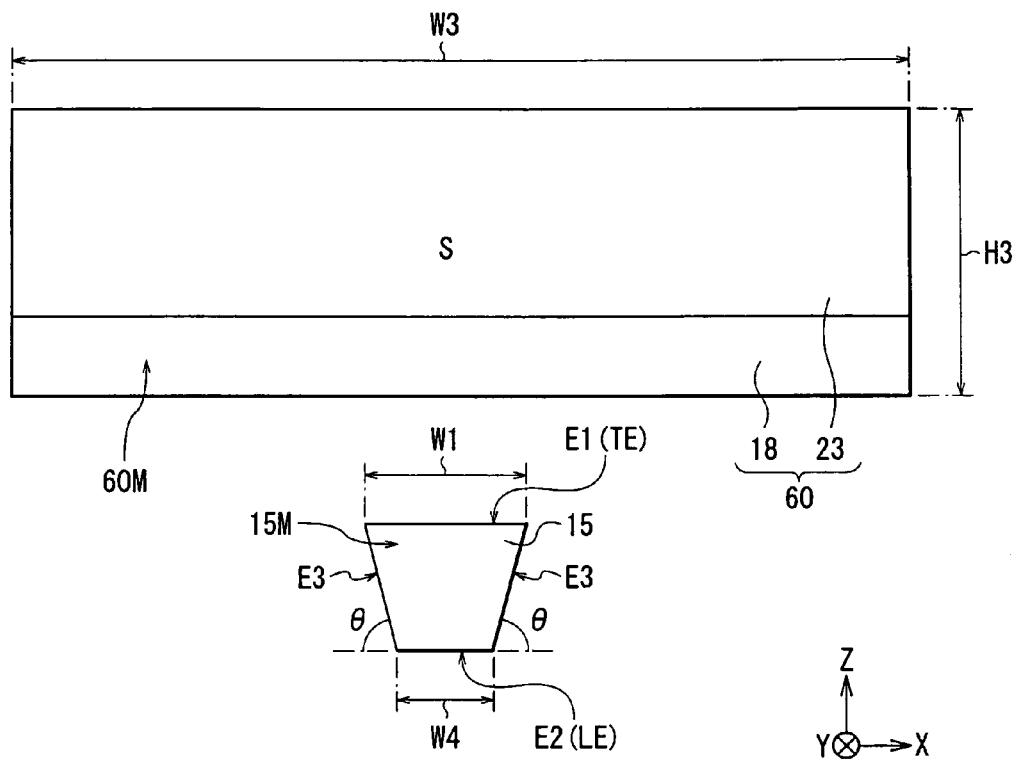
FIG. 3 is an enlarged plan view of an exposed surface as a main part of the thin film magnetic head shown in FIGS. 1A and 1B.
Figure 4:
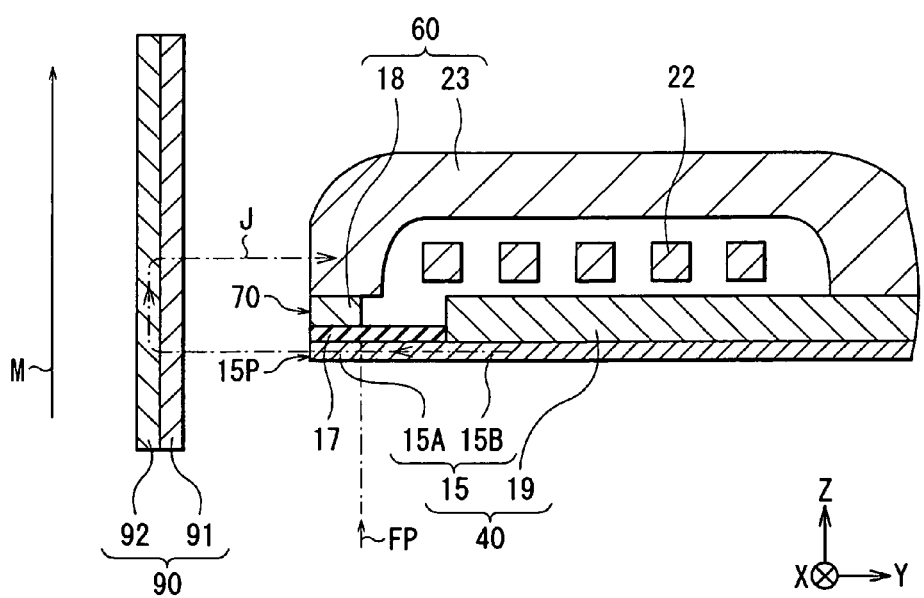
FIG. 4 is a schematic sectional view of a main part of the thin film magnetic head shown in FIGS. 1A and 1B.

At first, referring to FIGS. 1A and 1B through 4, the structure of a thin film magnetic head including a perpendicular magnetic recording head according to an embodiment of the invention will be described below. FIGS. 1A and 1B through 4 show the structure of the thin film magnetic head. FIGS. 1A and 1B show sectional views of the whole structure, and FIG. 2 shows a plan view of a main part (viewed from a Z-axis direction). FIG. 3 shows an enlarged plan view of an exposed surface as a main part (viewed from a Y-axis direction), and FIG. 4 shows a schematic sectional view of a main part. FIG. 1A shows a sectional view parallel to an air bearing surface (a sectional view along an XZ plane), and FIG. 1B shows a sectional view perpendicular to the air bearing surface (a sectional view along an YZ plane). An up arrow M shown in FIGS. 1A, 1B and 4 indicates a direction where a recording medium (not shown) relatively moves with respect to the thin film magnetic head (a medium travel direction). Moreover, in FIG. 4, a recording medium 90 which is subjected to a magnetic process by the thin film magnetic head is shown together with the thin film magnetic head.

In the following description, a dimension in an X-axis direction, a dimension in a Y-axis direction and a dimension in a Z-axis direction in FIGS. 1A and 1B through 4 are expressed as "width", "length" and "thickness or height", respectively. Further, a side closer to the air bearing surface in the Y-axis direction is expressed as "front", and the opposite side is expressed as "rear". The same expressions are used in FIG. 5 and later drawings.

For example, as shown in FIGS. 1A and 1B through 4, the thin film magnetic head is included in a magnetic recording apparatus such as a hard disk drive to perform a magnetic process on the recording medium 90 such as a hard disk which moves in a medium travel direction M. More specifically, the thin film magnetic head is a composite head capable of performing a recording process and a reproducing process as the magnetic process, and as shown in FIGS. 1A and 1B, the thin film magnetic head has a structure in which an insulating layer 2 made of, for example, a non-magnetic insulating material such as aluminum oxide ($Al_2O_3$; hereinafter simply referred to as "alumina"), a reproducing head portion 100A which performs the reproducing process through the use of a magnetoresistive (MR) effect, a separating layer 9 made of, for example, a non-magnetic insulating material such as alumina, a recording head portion 100B which performs the recording process by a perpendicular recording system, and an overcoat layer 24 made of, for example, a non-magnetic insulating material such as alumina are laminated in this order on a substrate 1 made of, for example, a ceramic material such as AlTiC ($Al_2O_3 \cdot TiC$).

The reproducing head portion 100A has, for example, a laminate structure in which a bottom read shield layer 3, a shield gap film 4 and a top read shield layer 30 are laminated in this order. An MR device 8 as a reproducing device is buried in the shield gap film 4 so that an end surface of the MR device 8 is exposed to an air bearing surface 70 facing the recording medium 90.

The bottom read shield layer 3 and the top read shield layer 30 are provided to magnetically separate the MR device 8 from its surroundings, and they extend from the air bearing surface 70 to the rear. The bottom read shield layer 3 is made of, for example, a magnetic material such as a nickel-iron alloy (NiFe (for example, Ni: 80 wt %, Fe: 20 wt %); hereinafter simply referred to as "Permalloy (trade name)") with a thickness of approximately 1.0 μm to 2.0 μm. The top read shield layer 30 has, for example, a structure in which a non-magnetic layer 6 is sandwiched between two top read shield layer portions 5 and 7, that is, a laminate structure (a three-layer structure) in which the top read shield layer portion 5, the non-magnetic layer 6 and the top read shield layer portion 7 are laminated in this order from a side closer to the shield gap film 4. The top read shield layer portion 5 is made of, for example, a magnetic material such as Permalloy with a thickness of approximately 1.5 μm. The top read shield layer portion 7 is made of the same magnetic material as that of the top read shield layer portion 5 with a thickness of approximately 1.1 μm. The non-magnetic layer 6 is made of, for example, a non-magnetic material such as ruthenium (Ru) or alumina with a thickness of approximately 0.2 μm. The top read shield layer 30 does not necessarily have a laminate structure, and may have a single-layer structure.

The shield gap film 4 is provided to electrically separate the MR device 8 from its surroundings, and is made of, for example, a non-magnetic insulating material such as alumina.

The MR device 8 is provided to perform the reproducing process through the use of, for example, a giant magnetoresistive (GMR) effect, a tunneling magnetoresistive (TMR) effect or the like.

The recording head portion 100B is a perpendicular magnetic recording head having, for example, a laminate structure in which a thin film coil 10 in a first stage which is buried in insulating layers 11, 12 and 13, a non-magnetic layer 14, a pole layer 40 of which surroundings are partially filled with an insulating layer 16, a gap layer 17, a thin film coil 22 in a second stage which is buried in an insulating layer 50 having an opening (a back gap 50BG) for magnetic connecting, and a magnetic layer 60 are laminated in this order, and is a so-called shield type head. In FIG. 2, mainly only a main part (the thin film coils 10 and 22, the pole layer 40 and the magnetic layer 60) of the recording head portion 100B is shown.

The thin film coil 10 is provided mainly to generate a magnetic flux for leakage prevention in order to prevent the leakage of a magnetic flux for recording generated in the thin film coil 22. The thin film coil 10 is made of, for example, a high conductive material such as copper (Cu) with a thickness of approximately 2.0 μm. In particular, the thin film coil 10 has, for example, a winding structure (a spiral structure) in which the thin film coil 10 is wound around the back gap 50BG as shown in FIGS. 1A, 1B and 2, and a current flows through the thin film coil 10, for example, in a direction opposite to a direction where a current flows through the thin film coil 22. In FIGS. 1A, 1B and 2, the number of turns of the thin film coil 10 is 5 turns; however, the number of turns of the thin film coil 10 is not necessarily limited to 5 turns, and can be freely changed. For example, the number of turns of the thin film coil 10 is preferably the same as the number of turns of the thin film coil 22, and more specifically the number of turns of the thin film coil 10 is preferably 2 to 7 turns.

The insulating layers 11, 12 and 13 are provided to electrically separate the thin film coil 10 from its surroundings. The insulating layer 11 is disposed so as to be filled in gaps between turns of the thin film coil 10, and to cover the surroundings of the thin film coil 10. The insulating layer 11 is made of, for example, a non-magnetic insulating material such as a photoresist or spin-on glass (SOG) exhibiting liquidity by heating with a thickness of approximately 2.0 µm. In this case, as shown in FIGS. 1A and 1B, only one side of the this film coil 10 is covered with the insulating layer 11, and a top of the thin film coil 10 is not covered with the insulating layer 11. The insulating layer 12 is disposed so as to cover the surroundings of the insulating layer 11. The insulating layer 12 is made of, for example, a non-magnetic insulating material such as alumina with a thickness of approximately 2.0 µm. The insulating layer 13 is disposed so that the thin film coil 10 and the insulating layers 11 and 12 are covered with the insulating layer 13. The insulating layer 13 is made of, for example, a non-magnetic insulating material such as alumina with a thickness of approximately 0.2 µm.

The non-magnetic layer 14 is made of, for example, a non-magnetic insulating material such as alumina or a non-magnetic conductive material such as ruthenium with a thickness of approximately 1.0 µm.

The pole layer 40 is provided mainly to perform the recording process through containing a magnetic flux for recording generated in a thin film coil 22, and then emitting the magnetic flux toward a recording medium, and more specifically, the pole layer 40 guides the magnetic flux to the recording medium 90 so that the recording medium 90 is magnetized in a direction orthogonal to its surface in order to perform a perpendicular recording system recording process. The pole layer 40 is disposed on a leading side of the thin film coil 22, and extends from the air bearing surface 70 to the rear, and more specifically extends to the back gap 50BG. When the movement of the recording medium 90 toward the medium travel direction M shown in FIGS. 1A, 1B and 4 is considered as a flow, the "leading side" means a side where the flow incomes (opposite to the medium travel direction M), and in this case, the leading side is a bottom side in a thickness direction (Z-axis direction). On the other hand, a side where the flow outgoes (the medium travel direction M) is called "trailing side", and in this case, the trailing side is a top side in the thickness direction.

In particular, as shown in FIGS. 1A and 1B, the pole layer 40 has a structure in which the main pole layer 15 and the auxiliary pole layer 19 are laminated in this order so as to be connected to each other, that is, a laminate structure (two-layer structure) in which the main pole layer 15 is disposed on a leading side, and the auxiliary pole layer 19 is disposed on a trailing side.

The main pole layer 15 functions as a main magnetic flux emitting portion. The main pole layer 15 extends from the air bearing surface 70 to the rear, more specifically from the air bearing surface 70 to the back gap 50BG, and the main pole layer 15 has a thickness of approximately 0.25 µm. In particular, the main pole layer 15 is made of, for example, a magnetic material with a higher saturated magnetic flux density than the magnetic material of the auxiliary pole layer 19, more specifically an iron-based alloy. Examples of the iron-based alloy include an iron-rich iron-nickel alloy (FeNi), an iron-cobalt alloy (FeCo), an iron-cobalt-nickel alloy (Fe-CoNi) and so on. In the description, "connected" means not only physically coming into contact with something to be connected, but also being magnetically connected so as to be able to bring in conduction while physically coming into contact to be connected, and the meaning of "connected" is the same in the following description. In particular, "physically coming into contact" in a structural relationship between the main pole layer 15 and the auxiliary pole layer 19 means not only the case where no layer is disposed between the main pole layer 15 and the auxiliary pole layer 19, that is, the main pole layer 15 and the auxiliary pole layer 19 are literally adjacent to each other to directly come into contact with each other but also the case where when the auxiliary pole layer 19 is formed, for example, by a plating process, a seed layer (made of, for example, titanium (Ti)) is disposed as a base layer for the auxiliary pole layer 19 because of a process factor in the plating process (the seed layer is sandwiched between the main pole layer 15 and the auxiliary pole layer 19), that is, the main pole layer 15 and the auxiliary pole layer 19 are indirectly in contact with each other with the seed layer in between.

For example, as shown in FIG. 2, the main pole layer 15 has a battledore-like planar shape as a whole. In other words, for example, the main pole layer 15 includes a front end portion 15A which extends from the air bearing surface 70 to the rear, and having a uniform width W1 determining the recording track width of the recording medium 90 and a rear end portion 15B which is connected to the rear of the front end portion 15A, and having a larger width W2 than the width W1 (W2>W1) in this order from the air bearing surface 70. A position where the width of the main pole layer 15 expands from the front end portion 15A (with the width W1) to the rear end portion 15B (with the width W2) is "a flare point FP" which is one of important factors in determining the recording performance of the thin film magnetic head.

The front end portion 15A is a portion where mainly a magnetic flux for recording generated in the thin film coil 22 is actually emitted toward the recording medium 90, and as shown in FIG. 2, the front end portion 15A includes an exposed surface 15M exposed to the air bearing surface 70. For example, as shown in FIG. 3, the exposed surface 15M has a planar shape determined by a top edge E1 on a trailing side, a bottom edge E2 on a leading side and two side edges E3. More specifically, the exposed surface 15M has, for example, a shape in which the width is gradually reduced from the trailing side to the leading side, that is, a symmetrical inverted trapezoidal shape which has the top edge E1 (so-called trailing edge TE; long side) with the width W1 as an upper base and the bottom edge E2 (so-called leading edge LE) with a smaller width W4 than the width W1 (W4<W1; short side) as a lower base. The top edge E1 (trailing edge TE) of the front end portion 15A is an actual recording point in the pole layer 40, and the width W1 of the top edge E1 is approximately 0.2 µm or less. In the planar shape of the exposed surface 15M, an angle θ between an extending direction of the bottom edge E2 and the side edges E3 can be freely set within a range of, for example, less than 90°.

The rear end portion 15B is a portion which contains the magnetic flux contained in the auxiliary pole layer 19, and provides the magnetic flux to the front end portion 15A. For example, the rear end portion 15B has a uniform width (width W2) in a rear portion thereof, and a width which is gradually reduced from the width W2 to the width W1 in a front portion thereof.

The auxiliary pole layer 19 functions as a main magnetic flux containing portion. For example, the auxiliary pole layer 19 extends from a position P1 at the rear of the air bearing surface 70 to the rear, more specifically to a position at the rear of the main pole layer 15 in the back gap 50BG, and the auxiliary pole layer 19 has a thickness of approximately 0.45 µm. In particular, the auxiliary pole layer 19 is made of, for example, a magnetic material with a lower saturated magnetic flux density than the magnetic material of the main pole layer 15, and more specifically, the auxiliary pole layer 19 is made of an iron-cobalt-nickel alloy or the like.

For example, as shown in FIG. 2, the auxiliary pole layer 19 has a rectangular planar shape with the width W2. In particular, for example, as shown in FIGS. 1A and 1B, the auxiliary pole layer 19 is planarized together with an after-mentioned auxiliary insulating layer 20 of the insulating layer 50 and an after-mentioned write shield layer 18 of the magnetic layer 60. In other words, a surface of the auxiliary pole layer 19 on the trailing side forms a flat surface HM together with a surface of the auxiliary insulating layer 20 on the trailing side and a surface of the write shield layer 18 on the trailing side, and these three surfaces are disposed in the same plane. Herein, "plane" in "the same plane" means a so-called virtual plane (XY plane).

The insulating layer 16 is provided to electrically separate the main pole layer 15 from its surroundings. The insulating layer 16 is made of, for example, a non-magnetic insulating material such as alumina with a thickness of approximately 0.25 µm.

The gap layer 17 forms a gap for electrically separating between the pole layer 40 and the magnetic layer 60. For example, as shown in FIGS. 1A and 1B, while the gap layer 17 is adjacent to the main pole layer 15 except for a region where the auxiliary pole layer 19 is disposed, the gap layer 17 extends from the air bearing surface 70 to the rear. In particular, the gap layer 17 is made of, for example, a non-magnetic insulating material such as alumina or a non-magnetic conductive material such as ruthenium with a thickness of approximately 0.03 µm to 0.1 µm.

The insulating layer 50 determines a throat height TH which is one of important factors determining the recording performance of the thin film magnetic head, and the insulating layer 50 covers the thin film coil 22 so as to electrically separate the thin film coil 22 from its surroundings. As shown in FIGS. 1A and 1B, the insulating layer 50 has a structure in which an auxiliary insulating layer 20 (a first insulating layer portion) which actually determines the throat height TH and a main insulating layer 21 (a second insulating layer portion) which actually covers the thin film coil 22 are laminated in this order, that is, a laminate structure (two-layer structure) in which the auxiliary insulating layer 20 is disposed on the leading side, and the main insulating layer 21 is disposed on the trailing side.

As shown in FIGS. 1A and 1B, the auxiliary insulating layer 20 is filled between an after-mentioned write shield layer 18 and the auxiliary pole layer 19, and determines the throat height TH in a position P2 adjacent to the write shield layer 18. In other words, the auxiliary insulating layer 20 extends from a position at the rear of the air bearing surface 70, more specifically the position P2 between the air bearing surface 70 and the position P1 to the position P1 in the rear side, while the auxiliary insulating layer 20 is adjacent to the gap layer 17, and the auxiliary insulating layer 20 is adjacent to the auxiliary pole layer 19 in the position P1 and the magnetic layer 60 (the write shield layer 18) in the position P2. In particular, for example, as described above, the auxiliary insulating layer 20 forms the flat surface HM together with the auxiliary pole layer 19 and the write shield layer 18. The above-described "position P2" is a forefront end position of the insulating layer 50 (the closest position to the air bearing surface 70), that is, "a throat height zero position TP" for determining the throat height TH, and the throat height TH is a distance between the air bearing surface 70 and the throat height zero position TP. The auxiliary insulating layer 20 is made of, for example, a non-magnetic insulating material such as alumina. In FIGS. 1A, 1B and 2, for example, the case where the throat height zero position TP matches the flare point FP is shown.

As shown in FIGS. 1A and 1B, the main insulating layer 21 extends from a position P3 between the position P1 and the position P2 to the rear while the main insulating layer 21 is adjacent to the flat surface HM of the auxiliary insulating layer 20, and more specifically, the main insulating layer 21 extends so as not to fill the back gap 50BG, that is, the main insulating layer 21 is positioned at the rear of the auxiliary insulating layer 20. For example, as shown in FIGS. 1A and 1B, the main insulating layer 21 includes a main insulating layer portion 21A disposed as a base of the thin film coil 22 on the flat surface HM of the auxiliary insulating layer 20 and a main insulating layer portion 21B disposed so that the thin film coil 22 and the main insulating layer portion 21A around the thin film coil 22 are covered with the main insulating layer portion 21B. The main insulating layer portion 21A is made of, for example, a non-magnetic insulating material such as alumina with a thickness of approximately 0.2 µm. The main insulating layer portion 21B is made of, for example, a non-magnetic insulating material such as a photoresist or spin-on glass (SOG) exhibiting liquidity by heating. A near-edge portion of the main insulating layer portion 21B has a rounded inclined surface which goes down to the edge.

The thin film coil 22 generates a magnetic flux for recording. For example, a current flows through the thin film coil 22 in a direction opposite to a direction where a current flows through the thin film coil 10. The material, the thickness and structural characteristics of the thin film coil 22 are the same as those of the thin film coil 10 except for above-described characteristics.

The magnetic layer 60 takes a spread portion of the magnetic flux for recording emitted from the pole layer 40 so as to increase the gradient of the perpendicular magnetic field, and takes a magnetic flux after recording (a magnetic flux used for recording) so as to circulate the magnetic flux between the recording head portion 100B and the recording medium 90. The magnetic layer 60 is disposed on the trailing side of the pole layer 40 and the thin film coil 22, and extends from the air bearing surface 70 to the rear so that the magnetic layer 60 is separated from the pole layer 40 by the gap layer 17 on a side closer to the air bearing surface 70, and is connected to the pole layer 40 through the back gap 50BG on a side farther from the air bearing surface 70.

As shown in FIG. 2, the magnetic layer 60 includes an exposed surface 60M exposed to the air bearing surface 70. For example, as shown in FIG. 3, the exposed surface 60M has a height H3 and a width W3 larger than the width W2 of the pole layer 40 (W3>W2), and has a rectangular shape (with a square measure S). For example, the maximum width (width W3) of the exposed surface 60M is larger than the maximum width (width W1) of the exposed surface 15M (W3>W1). Moreover, for example, as described above, when the width W1 of the top edge E1 (trailing edge TE) of the main pole layer 15 is 0.2 µm or less, the square measure S of the exposed surface 60M is approximately 7 µm² or more, preferably approximately 12.25 µm² or more, and more preferably approximately 70 µm² or more. In this case, for example, a relationship of $Y \geq \{7X/[9000 \times 10^3/(4\pi)]\} \times Z$ is preferably established, where the saturated magnetic flux density of the magnetic layer 60 is X [T], the magnetic square measure of the exposed surface 60M is Y [μm²T], and the maximum value of the strength of the perpendicular magnetic field which magnetizes the recording medium 90 is Z [×10³/(4π) A/m].

In particular, the magnetic layer 60 includes, for example, the write shield layer 18 (a first magnetic layer portion) and a return yoke layer 23 (a second magnetic layer portion) which are separate bodies, and the magnetic layer 60 has a structure in which the write shield layer 18 and the return yoke layer 23 are connected to each other.

The write shield layer 18 has a function of taking the above-described spread portion of the magnetic flux. The write shield layer 18 may have a function of taking the above-described magnetic flux after recording as in the case of the return yoke layer 23. The write shield layer 18 is disposed in a region near the air bearing surface 70 between the pole layer 40 and the return yoke layer 23 so as to be separated from the pole layer 40 by the gap layer 17. In other words, for example, as shown in FIGS. 1A and 1B, while the write shield layer 18 is disposed adjacent to the gap layer 17 to be separated from the pole layer 40 by the gap layer 17, the write shield layer 18 extends from the air bearing surface 70 to the rear, more specifically to the position P2 in front of the auxiliary pole layer 19, and in the position P2, the write shield layer 18 is adjacent to the auxiliary insulating layer 20 of the insulating layer 50. Moreover, the write shield layer 18 is made of, for example, a magnetic material with a high saturated magnetic flux density such as Permalloy or an iron-based alloy, and as shown in FIG. 2, the write shield layer 18 has a rectangular planar shape with the width W3. In particular, for example, as described above, the write shield layer 18 forms the flat surface HM together with the auxiliary pole layer 19 and the auxiliary insulating layer 20, that is, a surface of the write shield layer 18 on the trailing side is disposed in the same plane where the surface of the auxiliary pole layer 19 on the trailing side and the surface of the auxiliary insulating layer 20 on the trailing side are disposed. As described above, the write shield layer 18 is adjacent to the auxiliary insulating layer 20 in the position P2, so the write shield layer 18 acts a role which actually determines the throat height TH through determining the forefront end position of the insulating layer 50 (the throat height zero position TP).

The return yoke layer 23 has a function of taking the above-described magnetic flux after recording. For example, as shown in FIGS. 1A and 1B, the return yoke layer 23 extends from the air bearing surface 70 to the rear via the insulating layer 50 on the trailing side of the write shield layer 18, more specifically at least to the back gap 50BG. In other words, the return yoke layer 23 is connected to the write shield layer 18 on a side closer to the air bearing surface 70, and is connected to the pole layer 40 via the back gap 50BG on a side farther from the air bearing surface 70. In this case, for example, while the return yoke layer 23 is connected to the pole layer 40 in the back gap 50BG, the return yoke layer 23 extends to a position at the rear of the back gap 50BG. The return yoke layer 23 is made of, for example, the same magnetic material as the magnetic material of the write shield layer 18, and as shown in FIG. 2, the return yoke layer 23 has a rectangular planar shape with the width W3.

In the thin film magnetic head, for example, as shown in FIGS. 1A and 1B, in order to secure the recording performance, a series of dimensions determined on the basis of specific components are rightsized. More specifically, a distance from the air bearing surface 70 to the auxiliary pole layer 19, that is, a distance L1 between the air bearing surface 70 and the position P1 is approximately 0.8 μm to 7.1 μm. Moreover, a distance from the air bearing surface 70 to the main insulating layer 21, that is, a distance L3 between the air bearing surface 70 to the position P3 is longer than the length of the write shield layer 18, that is the distance L2 between the air bearing surface 70 and the position P2 (L3>L2). On the basis of a structural relationship that the distance L3 is longer than the distance L2, in the magnetic layer 60, the length of a portion of the return yoke layer 23 adjacent to the write shield layer 18 (that is, the distance L3) is longer than the length of the write shield layer 18 (that is, the distance L2). Thereby, when a magnetic flux is taken into the return yoke layer 23 via the write shield layer 18 in the magnetic layer 60, a magnetic path where the magnetic flux flows through the magnetic layer 60 is gradually widened.

For example, as shown in FIG. 4, the recording medium 90 includes a magnetized layer 91 and a soft magnetic layer 92 which are laminated, and the magnetized layer 91 is disposed so as to face the air bearing surface 70. The magnetized layer 91 is a layer on which information is magnetically recorded, and the soft magnetic layer 92 functions as a magnetic flux flow path (so-called flux path). The recording medium 90 including the magnetized layer 91 and the soft magnetic layer 92 is generally called "two-layer recording medium" for perpendicular recording.

Next, referring to FIGS. 1A and 1B through 4, actions of the thin film magnetic head will be described below.

In the thin film magnetic head, at the time of recording information, when a current flows into the thin film coils 10 and 22 of the recording head portion 100B from an external circuit (not shown), a magnetic flux J for recording is generated mainly in the thin film coil 22. After the magnetic flux J generated at this time is contained in the pole layer 40 (the main pole layer 15 and the auxiliary pole layer 19), the magnetic flux J flows to the front end portion 15A of the main pole layer 15 in the pole layer 40. At this time, the magnetic flux J flowing through the main pole layer 15 is concentrated at the flare point FP with a decrease in the width of the main pole layer 15, so the magnetic flux J is finally focused on a portion of the exposed surface 15M of the front end portion 15A in proximity to the trailing edge TE. When the magnetic flux J focused on the portion in proximity to the trailing edge TE is emitted to outside, a recording magnetic field (a perpendicular magnetic field) is generated in a direction orthogonal to a surface of the recording medium 90, and the magnetized layer 91 is magnetized by the perpendicular magnetic field, so information is magnetically recorded on the recording medium 90.

In this case, the current flows through the thin film coils 10 and 22 in opposite directions, so magnetic fluxes are generated in the thin film coils 10 and 22 toward opposite directions. More specifically, referring to FIGS. 1A and 1B, while the magnetic flux (a magnetic flux for leakage prevention) is generated upward in the thin film coil 10, the magnetic flux (a magnetic flux for recording) is generated downward in the thin film coil 22. Thereby, the downward magnetic flux generated in the thin film coil 22 is not easily transferred from the recording head portion 100B to the reproducing head portion 100A due to an influence of the upward magnetic flux generated in the thin film coil 10, so the magnetic flux for recording generated in the thin film coil 22 can be prevented from being leaked to the reproducing head portion 100A.

Moreover, when the magnetic flux J is emitted from the front end portion 15A, a spread portion of the magnetic flux J is taken in the write shield layer 18. Thereby, the spread of the magnetic flux J can be prevented. The magnetic flux taken in the write shield layer 18 is provided to the pole layer 40 via the back gap 50BG again.

At the time of recording information, when the magnetic flux J is emitted from the pole layer 40 to the recording medium 90, the magnetic flux J magnetizes the magnetized layer 91, and then the magnetic flux J is taken in the return yoke layer 23 via the soft magnetic layer 92. At this time, a part of the magnetic flux J is taken in the write shield layer 18. The magnetic flux J taken in the write shield layer 18 and the return yoke layer 23 is provided to the pole layer 40 via the back gap 50BG again. Thereby, the magnetic flux J is circulated between the recording head portion 100B and the recording medium 90, so a magnetic circuit is established.

On the other hand, at the time of reproducing information, when a sense current flows through the MR device 8 of the reproducing head portion 100A, the resistance of the MR device 8 is changed according to a signal magnetic field for reproducing from the recording medium 90, so a change in the resistance of the MR device 8 is detected as a change in the sense current, thereby information recorded on the recording medium 90 is magnetically reproduced.

Next, referring to FIGS. 1A and 1B through 17, a method of manufacturing a thin film magnetic head including the perpendicular magnetic recording head according to the embodiment of the invention will be described below. FIGS. 5A and 5B through 17 are illustrations for describing steps of manufacturing the thin film magnetic head. Among them, FIGS. 5A and 5B through 11A and 11B are illustrations for describing steps of manufacturing the recording head portion 100B in the thin film magnetic head, and shows sectional views corresponding to FIGS. 1A and 1B. FIGS. 12 through 17 are illustrations for describing steps of forming the main pole layer 15 in the recording head portion 100B, and shows enlarged sectional views corresponding to FIG. 1A.

At first, the steps of manufacturing the thin film magnetic head will be briefly described below referring to FIGS. 1A and 1B, and then the steps of forming the recording head portion 100B to which a method of manufacturing the perpendicular magnetic recording head according to the embodiment of the invention is applied will be described in detail below referring to FIGS. 1A and 1B through 17. The materials, dimensions and structural characteristics of components of the thin magnetic head will not be further described, because they have been already described above.

The thin film magnetic head is manufactured through laminating each component in order mainly through the use of existing thin film processes including film formation techniques typified by plating and sputtering, patterning techniques typified by photolithography, etching techniques typified by dry etching and wet etching, and so on. In other words, as shown in FIGS. 1A and 1B, when the thin film magnetic head is manufactured, at first, after the insulating layer 2 is formed on the substrate 1, the bottom read shield layer 3, the shield gap film 4 in which the MR device 6 is buried, and the top read shield layer 30 (the top read shield layer portion 5, the non-magnetic layer 6 and the top read shield layer potion 7) are laminated in this order on the insulating layer 2 so as to form the reproducing head portion 100A. Next, after the separating layer 9 is formed on the reproducing head portion 100A, on the separating layer 9, the thin film coil 10 which is buried in the insulating layers 11 through 13, the non-magnetic layer 14, the pole layer 40 (the main pole layer 15 and the auxiliary pole layer 19) of which surroundings are partially filled with the insulating layer 16, the gap layer 17, the thin film coil 22 which is buried in the insulating layer 50 (the auxiliary insulating layer 20 and the main insulating layer 21 (the main insulating layer portions 21A and 21B)), and the magnetic layer 60 (the write shield layer 18 and the return yoke layer 23) are laminated in this order so as to form the recording head portion 100B. Finally, after the overcoat layer 24 is formed on the recording head portion 100B, the air bearing surface 70 is formed through machining or polishing to complete the thin film magnetic head.

Figure 5B:
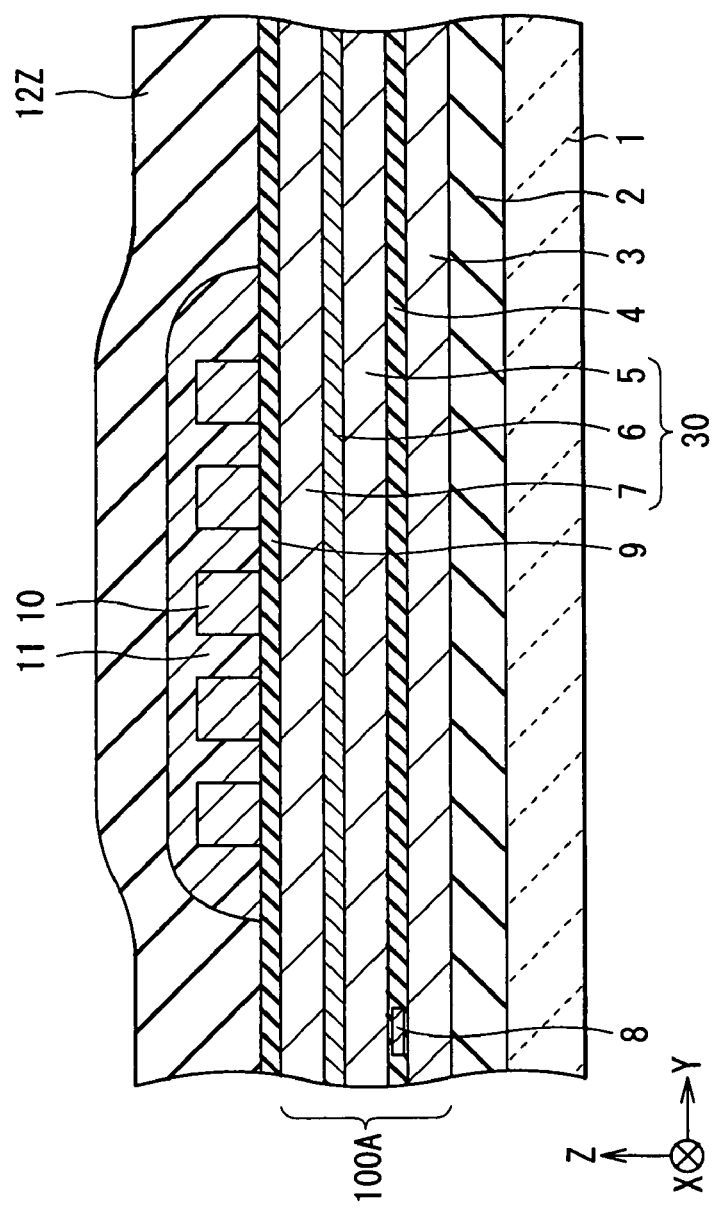
FIGS. 5A and 5B are sectional views for describing a step in steps of manufacturing a recording head portion in a method of manufacturing a thin film magnetic head including a perpendicular magnetic recording head according to an embodiment of the invention.
Figure 5A:
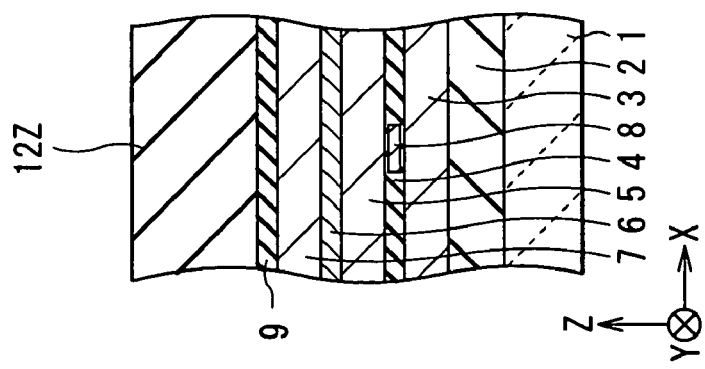

When the recording head portion 100B of the thin film magnetic head is manufactured, after forming the separating layer 9, at first, as shown in FIGS. 5A and 5B, the thin film coil 10 with a thickness of approximately 2.5 μm is pattern-formed on the separating layer 9, for example, through selectively growing a plating film by a plating process. As shown in FIG. 2, the thin film coil 10 is formed so as to have a spiral structure in which the thin film coil 10 is wound around the back gap 50BG which is formed in a later step. A technique of pattern-forming used in a plating process will be described in detail later referring to steps of forming the main pole layer 15 as an example. Next, after a photoresist film is formed through the use of, for example, photolithography so that a portion between turns of the thin film coil 10 and its surroundings are selectively covered with the photoresist film, the photoresist film is fired so as to pattern-form the insulating layer 11 having a rounded inclined surface in a near-edge portion thereof. Next, a precursory insulating layer 12Z is formed through the use of, for example, sputtering so that the insulating layer 11 and the separating layer 9 around the insulating layer 11 are covered with the precursory insulating layer 12Z. The precursory insulating layer 12Z is a preparatory layer which becomes the insulating layer 12 by polishing in a later step. When the precursory insulating layer 12Z is formed, for example, the thickness of the precursory insulating layer 12Z is adjusted so that the surface thereof is disposed in a position higher than a position where a surface of the insulating layer 11 is disposed.

Figure 6B:
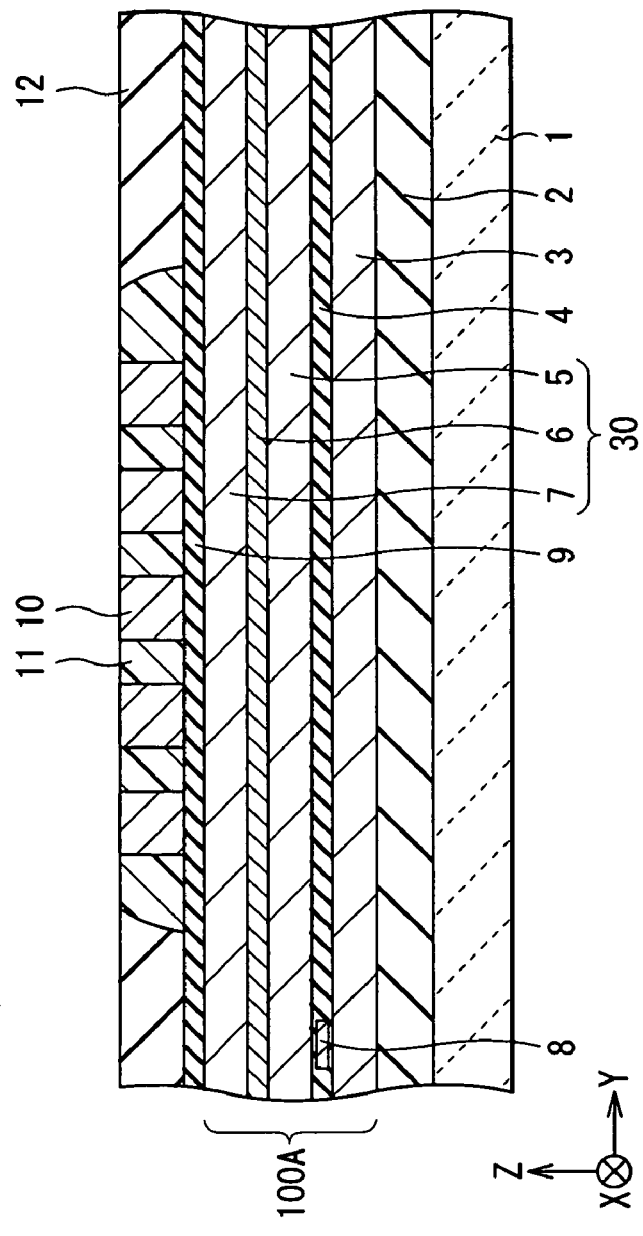
FIGS. 6A and 6B are sectional views for describing a step following the step of FIGS. 5A and 5B.
Figure 6A:
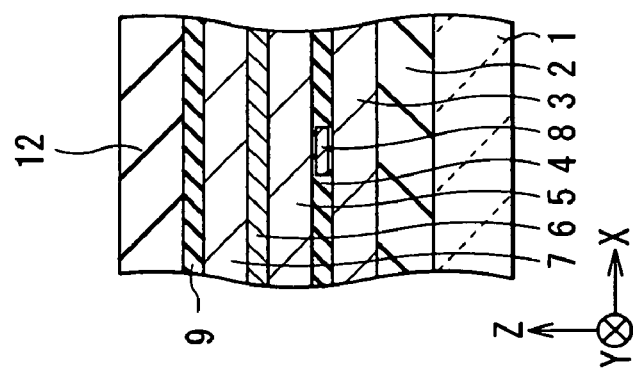

Next, the precursory insulating layer 12Z and the insulating layer 11 are polished by, for example, a CMP (Chemical Mechanical Polishing) method until the thin film coil 10 is exposed to be planarized, thereby as shown in FIGS. 6A and 6B, the insulating layer 12 is formed so that the surroundings of the insulating layer 11 are buried in the insulating layer 12. When the insulating layer 12 is formed, for example, the thin film coil 10 is polished together with the precursory insulating layer 12Z and the insulating layer 11 so that the thin film coil 10 has a thickness of approximately 2.0 μm.

Figure 7B:
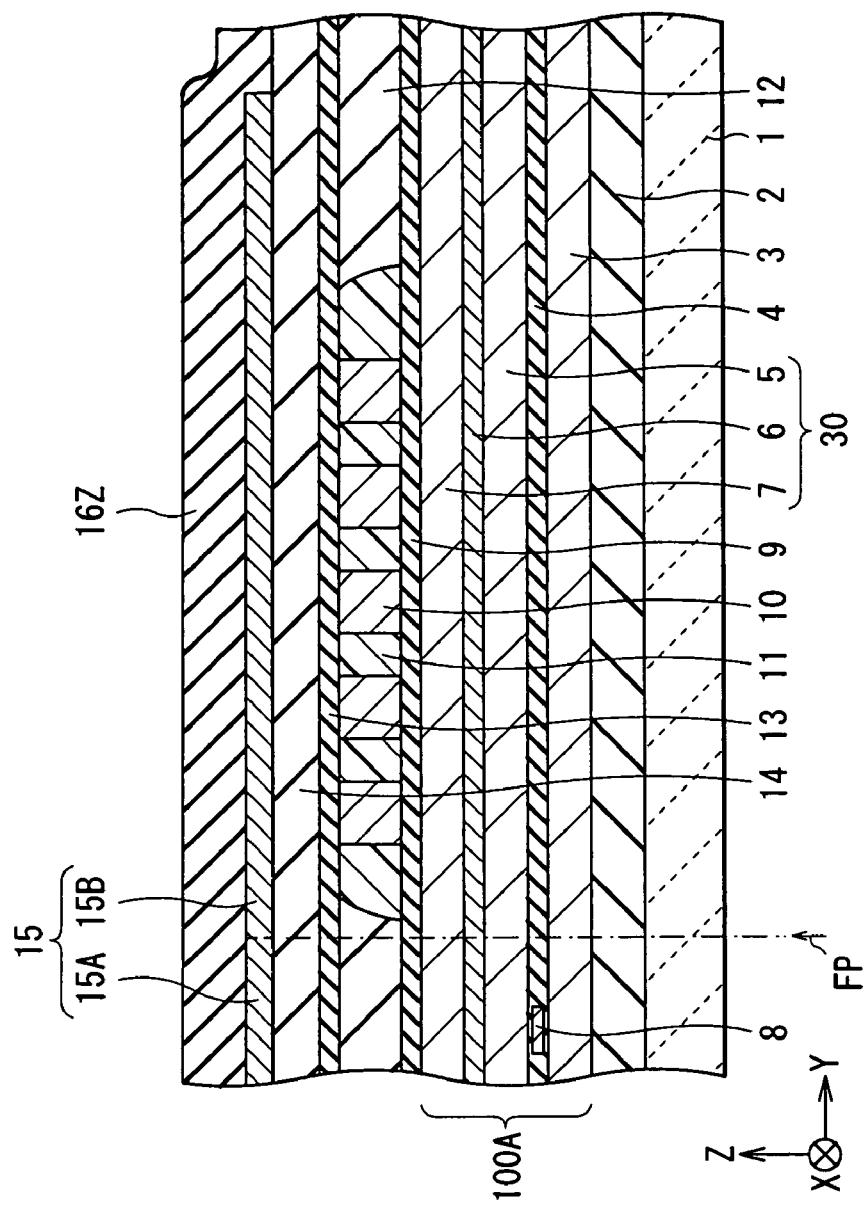
FIGS. 7A and 7B are sectional views for describing a step following the step of FIGS. 6A and 6B.
Figure 7A:
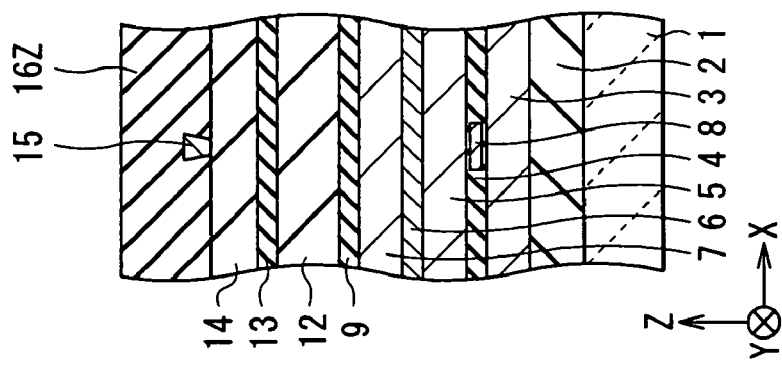

Next, as shown in FIGS. 7A and 7B, the insulating layer 13 with a thickness of approximately 0.2 μm is formed by, for example, sputtering so that a flat surface including the thin film coil 10 and the insulating layers 11 and 12 after polishing is covered with the insulating layer 13. When the insulating layer 13 is formed, the thin film coil 10 is buried in the insulating layers 11 through 13, so the thin film coil 10 is electrically separated from its surroundings. Next, the non-magnetic layer 14 with a thickness of approximately 1.8 μm is formed by, for example, sputtering so that the insulating layer 13 is covered with the non-magnetic layer 14. Then, in order to planarize a surface of the non-magnetic layer 14, that is, a base where the main pole layer 15 is formed in a later step, the non-magnetic layer 14 is polished by, for example, the CMP method to be planarized. When the non-magnetic layer 14 is planarized, for example, the non-magnetic layer 14 is polished so as to have a thickness of approximately 1.0 μm. Then, a plating film is selectively grown on the non-magnetic layer 14 through the use of, for example, a plating process so as to pattern-form the main pole layer 15 with a thickness of approximately 0.25 μm. For example, as shown in FIG. 2, the main pole layer 15 is formed so as to include the front end portion 15A with the width W1 and the rear end portion 15B with the width W2 larger than the width W1 in order from a position where the air bearing surface 70 is formed in a later step, and as shown in FIG. 3, the main pole layer 15 is formed so as to have a symmetrical inverted trapezoidal exposed surface 15M at the time of forming the air bearing surface 70 in a later step. Thereby, at the time of forming the air bearing surface 70 in a later step, the main pole layer 15 is formed so as to extend from the air bearing surface 70 to the rear. As the main pole layer 15 is formed on the non-magnetic layer 14 planarized by polishing, the main pole layer 15 can be pattern-formed with high precision by a plating process. Next, a precursory insulating layer 16Z is formed through the use of, for example, sputtering so that the main pole layer 15 and the non-magnetic layer 14 around the main pole layer 15 are covered with the precursory insulating layer 16Z. The precursory insulating layer 16Z is a preparatory layer which becomes the insulating layer 16 by polishing in a later step. When the precursory insulating layer 16Z is formed, for example, the thickness of the precursory insulating layer 16Z is adjusted so that a surface of the precursory insulating layer 16Z is disposed in a position higher than a position where a surface of the main pole layer 15 is disposed.

Figure 8B:
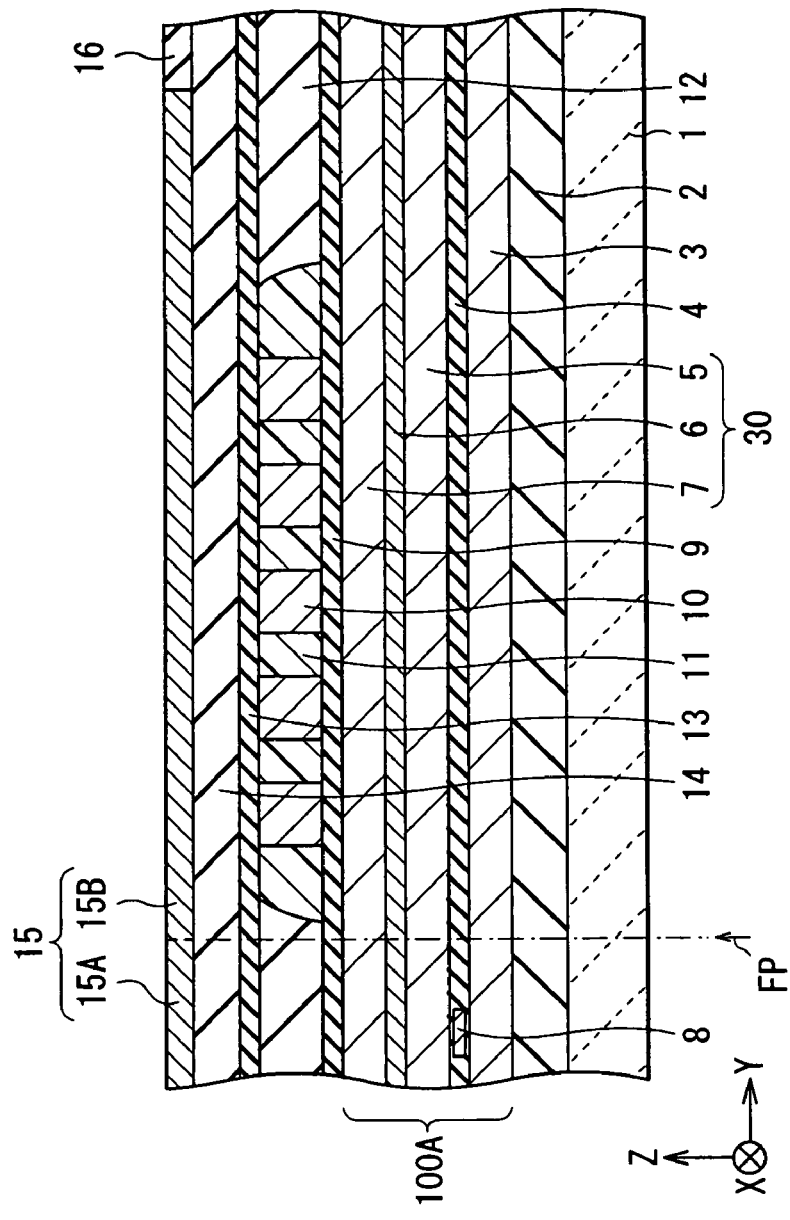
FIGS. 8A and 8B are sectional views for describing a step following the step of FIGS. 7A and 7B.
Figure 8A:
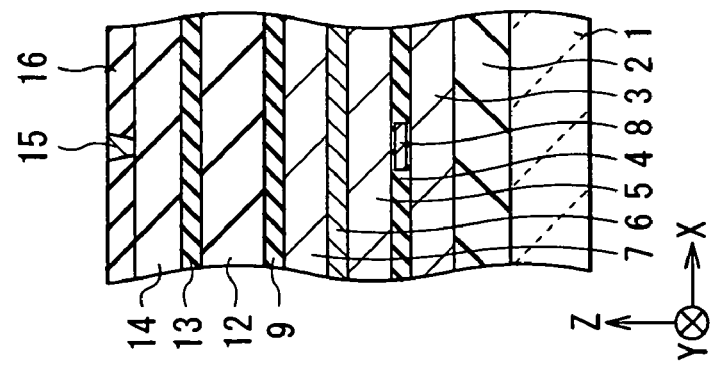

Next, the precursory insulating layer 16Z is polished through the use of, for example, the CMP method until the main pole layer 15 is exposed so as to be planarized, thereby, as shown in FIGS. 8A and 8B, the insulating layer 16 is formed so that the surroundings of the main pole layer 15 are filled with the insulating layer 16.

For example, the details of the steps of forming the main pole layer 15 and the insulating layer 16 are as below.

Figure 12:
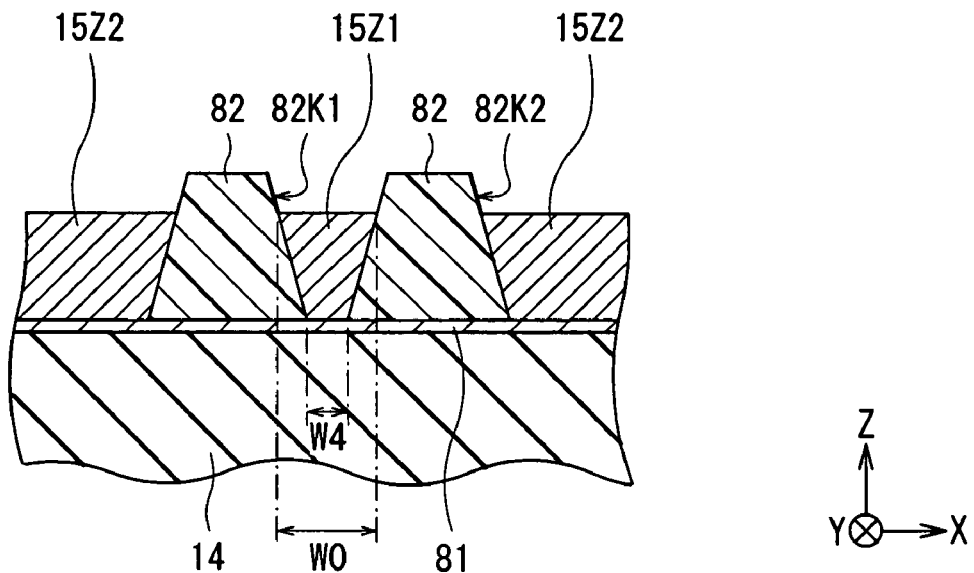
FIG. 12 is a sectional view for describing a step in steps of forming a main pole layer.

When the main pole layer 15 and the insulating layer 16 are formed, at first, as shown in FIG. 12, a seed layer 81 as an electrode film is formed on the non-magnetic layer 14 through the use of, for example, sputtering so as to have a thickness of approximately 50.0 nm. As the material of the seed layer 81, for example, a magnetic material such as Permalloy, a non-magnetic material such as gold (Au) or a gold-copper alloy (AuCu) or a combination of a magnetic material and a non-magnetic material may be used. Next, after a photoresist film is formed through applying a photoresist to a surface of the seed layer 81, the photoresist film is patterned by photolithography to form a photoresist pattern 82 for forming the main pole layer 15. For example, the photoresist pattern 82 is formed so as to have an opening 82K1 which has an opening pattern corresponding to a planar shape of the main pole layer 15, and the opening width of the opening 82K1 is gradually reduced toward the seed layer 81, and the photoresist pattern 82 is formed so as to have another opening 82K2 around a pattern portion determining the opening 82K1 together with the opening 82K1. In this case, in particular, for example, a bottom end width of the opening 82K1 matches the width W4 of the bottom edge E2 shown in FIG. 3 (for example, the width W4=0.04 μm). As the material of the photoresist pattern 82, for example, as described above, a photoresist with low transmittance is preferably used because the opening 82K1 is formed so as to have an opening width gradually reduced toward the seed layer 81. Next, the seed layer 81 formed in a former step is used as an electrode film to grow a plating film in the openings 82K1 and 82K2 in the photoresist pattern 82, thereby a precursory main pole layer 15Z1 is formed in the opening 82K1, and a precursory main pole layer 15Z2 is formed in the opening 82K2. The precursory main pole layer 15Z1 is a preparatory layer which becomes the main pole layer 15 by polishing in a later step. For example, the precursory main pole layers 15Z1 and 15Z2 are formed so that the thicknesses of the precursory main pole layers 15Z1 and 15Z2 are smaller than the thickness of the photoresist pattern 82. In this case, in particular, for example, the precursory main pole layer 15Z1 is formed so that the top end width of the precursory main pole layer 15Z1 is a width W0 larger than the width W1 of the top edge E1 shown in FIG. 3 (W0>W1).

Figure 13:
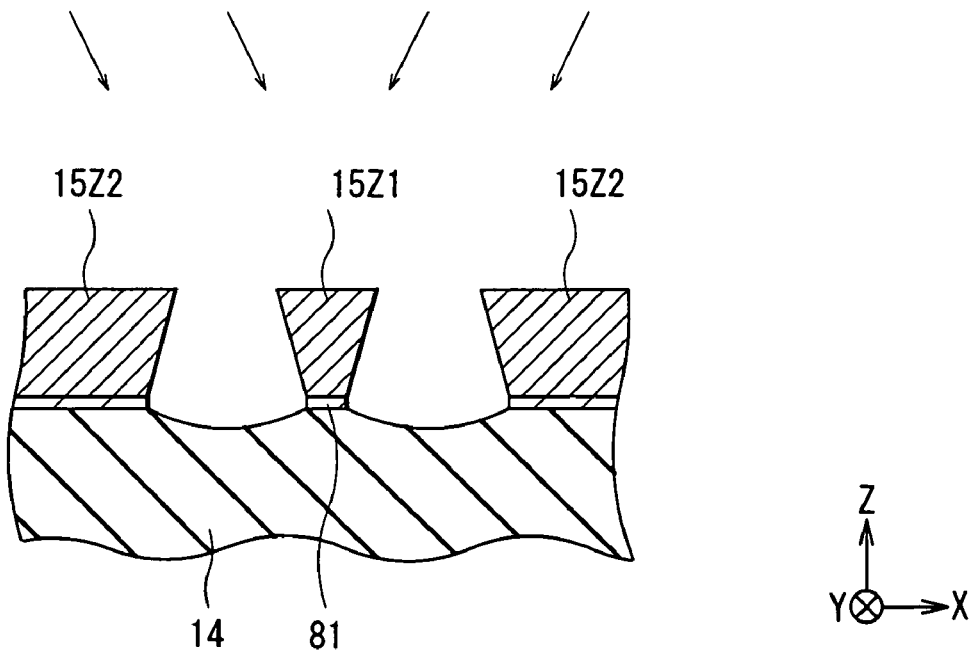
FIG. 13 is a sectional view for describing a step following the step of FIG. 12.

Next, after removing the photoresist pattern 82, the used seed layer 81 is etched through the use of the precursory main pole layers 15Z1 and 15Z2 as masks by, for example, ion milling, and then as shown in FIG. 13, a portion of the seed layer 81 which is not covered with the precursory main pole layers 15Z1 and 15Z2 as an unnecessary portion is selectively removed. When the seed layer 81 is etched, the non-magnetic layer 14 is partially etched together with the seed layer 81, so the non-magnetic layer 14 is partially removed so as to partially reduce the thickness of the non-magnetic layer 14 by approximately 0.2 μm.

Figure 14:
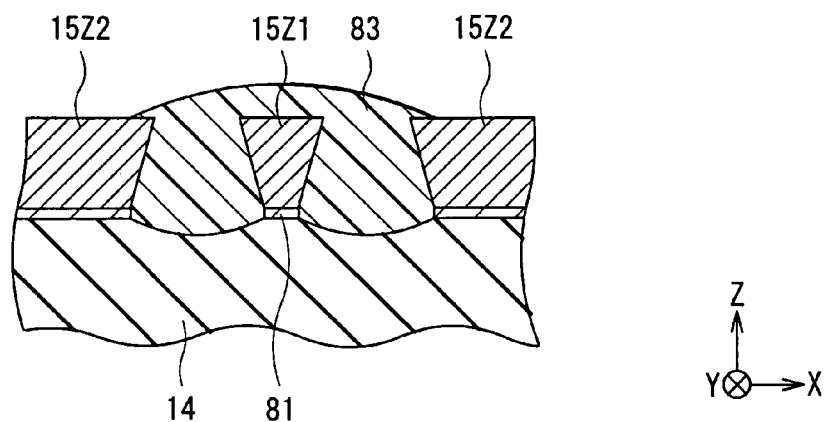
FIG. 14 is a sectional view for describing a step following the step of FIG. 13.

Next, the photoresist film is patterned by photolithography, thereby as shown in FIG. 14, a mask 83 for etching is pattern-formed so as to cover the precursory main pole layer 15Z1 and the non-magnetic layer 14 around the precursory main pole layer 15Z1. When the mask 83 is formed, an area where the mask 83 is formed is adjusted so that, for example, the precursory main pole layer 15Z1 is completely covered with the mask 83, and a most part of the precursory main pole layer 15Z2 is exposed.

Figure 15:
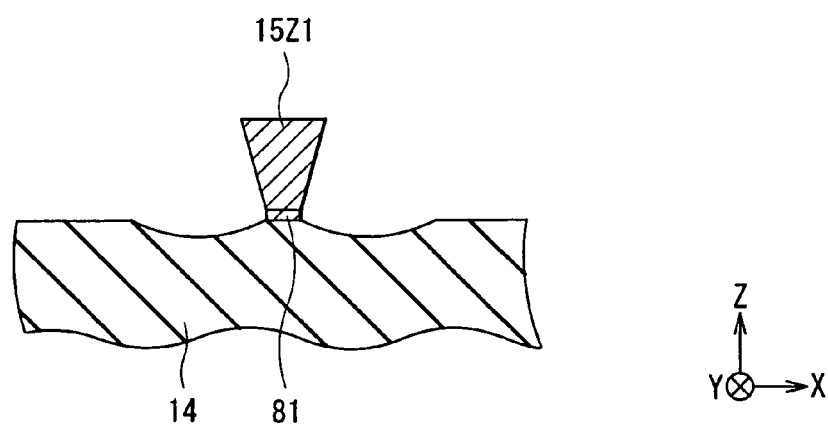
FIG. 15 is a sectional view for describing a step following the step of FIG. 14.

Then, when the precursory main pole layer 15Z2 which is not covered with the mask 83 is etched by, for example, wet etching using an etchant such as a ferric chloride (FeCl$_3$) solution, as shown in FIG. 15, the precursory main pole layer 15Z2 is selectively removed. After that, the mask 83 is removed so as to expose the precursory main pole layer 15Z1.

Figure 16:
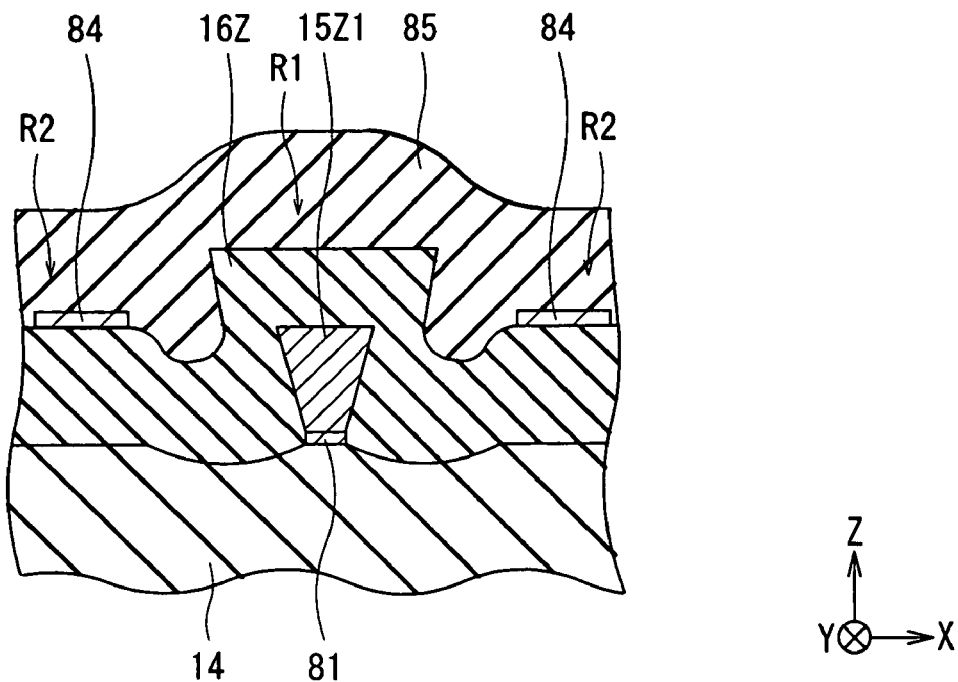
FIG. 16 is a sectional view for describing a step following the step of FIG. 15.

Then, as shown in FIG. 16, the above-described precursory insulating layer 16Z is formed by, for example, sputtering so as to cover the precursory main pole layer 15Z1 and the non-magnetic layer 14 around the precursory main pole layer 15Z1. When the precursory insulating layer 16Z is formed, the precursory insulating layer 16Z is formed so as to reflect an uneven structure formed by the non-magnetic layer 14 and the precursory main pole layer 15Z1, so a region R1 corresponding to a region where the precursory main pole layer 15Z1 is disposed is relatively high, and a region R2 corresponding to a region around the precursory main pole layer 15Z1 is relatively low. Next, a stopper layer 84 for controlling the progress of etching with a thickness of approximately 100 nm is formed on the precursory insulating layer 16Z in the above-described region R2 so as to be disposed on both sides of the precursory main pole layer 51Z1. As the material of the stopper layer 84, for example, a material which is resistant to polishing in a polishing process using the CMP method is used, and more specifically, tantalum (Ta) is used. Next, an insulating layer 85 is formed by, for example, sputtering so as to cover the stopper layer 84 and the precursory insulating layer 16Z around the stopper layer 84. As the material of the insulating layer 85, for example, the same non-magnetic insulating material as that used as the material of the precursory insulating layer 16Z is used. With regard to the material of the stopper layer 84, the above-described "a material which is resistant to polishing in a polishing process using the CMP method" means a material with a much lower polishing speed than the polishing speeds of the insulating layer 85, the precursory insulating layer 16Z and the precursory main pole layer 15Z1 when comparing between the polishing speeds of the stopper layer 84, the insulating layer 85, the precursory insulating layer 16Z and the precursory main pole layer 15Z1 in a polishing process using the CMP method.

Figure 17:
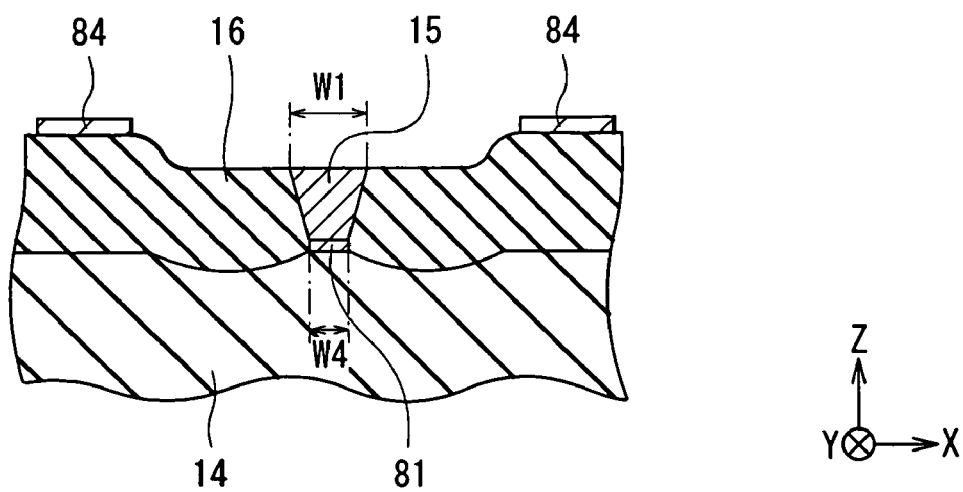
FIG. 17 is a sectional view for describing a step following the step of FIG. 16.

Finally, the insulating layer 85 and the precursory main pole layer 16Z are polished by, for example, the CMP method until the precursory main pole layer 15Z1 is exposed, thereby as shown in FIG. 17, the main pole layer 15 and the insulating layer 16 are formed. When the main pole layer 15 is formed, for example, the precursory main pole layer 15Z1 is polished together with the insulating layer 85 and the precursory insulating layer 16Z so that the top end width of the main pole layer 15 matches the width W1 of the top edge shown in FIG. 3 (for example, the width W1=approximately 0.14 μm). When the insulating layer 85, the precursory insulating layer 16Z and the precursory main pole layer 15Z1 are polished, as described above, the polishing speed of the stopper layer 84 is much lower than the polishing speeds of the insulating layer 85, the precursory insulating layer 16Z and the precursory main pole layer 15Z1, so the stopper layer 84 stops the progress of the etching process. More specifically, when the insulating layer 85, the precursory insulating layer 16Z and the precursory main pole layer 15Z1 are polished in order, the progress of the polishing process stops at the time when a polishing effect reaches the stopper layer 84. When the polishing process stops, the precursory insulating layer 16Z and the precursory main pole layer 15Z1 are partially and excessively polished in a region which is not covered with the stopper layer 84, so as shown in FIG. 17, the insulating layer 16 and the main pole layer 15 are partially removed so that the top edges of the insulating layer 16 and the main pole layer 15 are partially lower than a position where the stopper layer 84 is disposed. When the main pole layer 15 is formed through the above-described polishing process, for example, the main pole layer 15 may be further etched by an etching technique such as ion milling or focused ion beam etching (FIB) so as to finely adjust the top end width of the main pole layer 15. After that, the stopper layer 84 is removed, thereby the steps of forming the main pole layer 15 and the insulating layer 16 shown in FIGS. 8A and 8B are completed. In FIGS. 1A and 1B and FIGS. 5A and 5B through 11A and 11B, a depression formed on the non-magnetic layer 14 and the seed layer 81 are not shown.

Figure 9B:
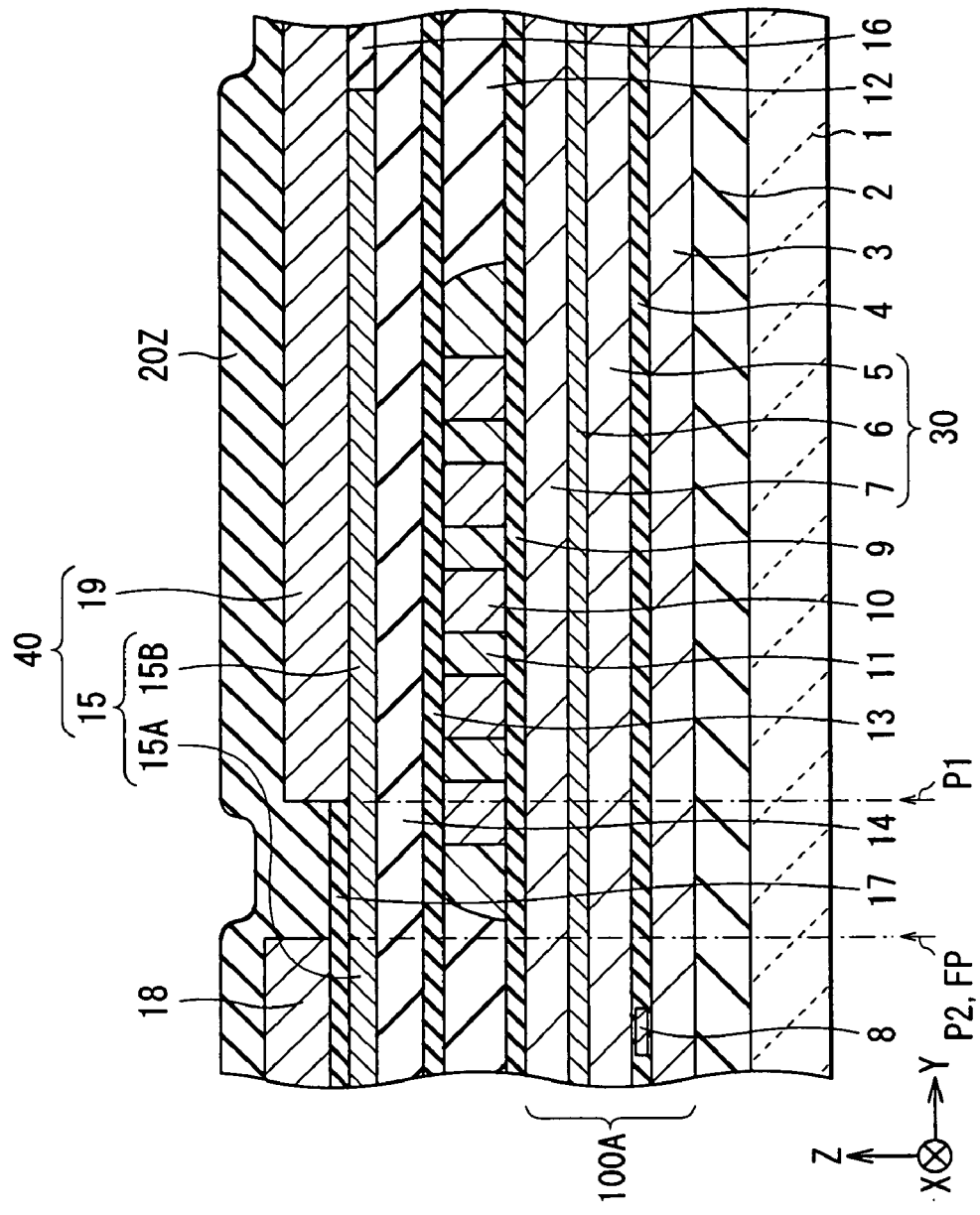
FIGS. 9A and 9B are sectional views for describing a step following the step of FIGS. 8A and 8B.
Figure 9A:
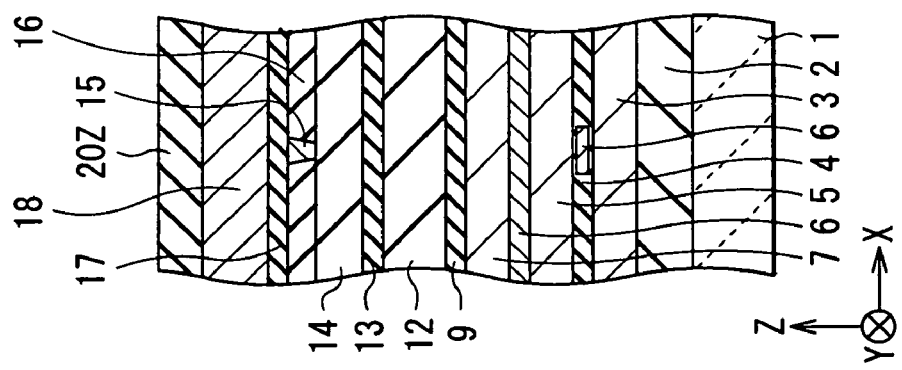

Next, steps of manufacturing the recording head portion 100B in the thin film magnetic head will be described below. After forming the main pole layer 15 and the insulating layer 16, as shown in FIGS. 9A and 9B, the gap layer 17 is pattern-formed on the main pole layer 15 by, for example, sputtering so as to have a thickness of approximately 0.05 μm. When the gap layer 17 is formed, an area where the gap layer 17 is formed is adjusted through the use of, for example, a liftoff process so that a region where the auxiliary pole layer 19 is formed in a later step is not covered, that is, the main pole layer 15 is partially exposed. Next, a plating film is selectively grown on the gap layer 17 through the use of, for example, a plating process to pattern-form the write shield layer 18 with a thickness of approximately 0.7 μm. When the write shield layer 18 is formed, the write shield layer 18 is formed so as to extend from a position where the air bearing surface 70 is formed in a later step to the position P2 at the rear of the position, and the forming length of the write shield layer 18 is adjusted in consideration of the fact that the throat height zero position TP is determined on the basis of the position P2, that is, the throat height TH (for example, the throat height TH=approximately 0.25 μm) is determined on the basis of the forming length (distance L2) of the write shield layer 18. In particular, when the write shield layer 18 is formed, for example, the plating process performed to form the write shield layer 18 is also used to selectively grow another plating film, thereby the auxiliary pole layer 19 with a thickness of approximately 0.7 μm is formed on the exposed surface of the main pole layer 15. The auxiliary pole layer 19 is formed so as to extend from the position P1 at the rear of the position where the air bearing surface 70 is formed in a later step to the rear, and to adjust the forming position in consideration of the fact that a distance by which the auxiliary pole layer 19 is recessed (distance L1) is determined on the basis of the position P1. Thereby, when the air bearing surface 70 is formed in a later step, the auxiliary pole layer 19 is formed so as to extend from the position P1 at the rear of the air bearing surface 70 to the rear. Next, a precursory auxiliary insulating layer 20Z is formed by, for example, sputtering so as to cover the write shield layer 18, the auxiliary pole layer 19 and the gap layer 17 around the write shield layer 18 and the auxiliary pole layer 19. The precursory auxiliary insulating layer 20Z is a preparatory layer which becomes the auxiliary insulating layer 20 in a later step. When the precursory auxiliary insulating layer 20 is formed, for example, the forming thickness of the precursory auxiliary insulating layer 20 is adjusted so that the surface of the precursory auxiliary insulating layer 20 is higher than the surface of the write shield layer 18.

Next, the precursory auxiliary insulating layer 20Z and the write shield layer 18 are polished by, for example, the CMP method until the auxiliary pole layer 19 is exposed, thereby, as shown in FIGS. 10A and 10B, the auxiliary insulating layer 20 is formed on the gap layer 17 so as to extend from the position P2 to the position P1. When the auxiliary insulating layer 20 is formed, for example, the auxiliary pole layer 19 is polished together with the precursory auxiliary insulating layer 20Z and the write shield layer 18 so that the write shield layer 18 has a thickness of approximately 0.45 μm. When the precursory auxiliary insulating layer 20Z, the write shield layer 18 and the auxiliary pole layer 19 are planarized, a surface on a trailing side of the auxiliary insulating layer 20, a surface on the trailing side of the write shield layer 18 and a surface on the trailing side of the auxiliary pole layer 19 form the flat surface HM. Thereby, the pole layer 40 is formed so as to have a laminate structure in which the main pole layer 15 disposed on the leading side and the auxiliary pole layer 19 disposed on the trailing side are laminated.

Then, as shown in FIGS. 11A and 11B, the main insulating layer 21 is formed so that while the main insulating layer 21 is adjacent to the flat surface HM formed by the auxiliary insulating layer 20 and the auxiliary pole layer 19, the main insulating layer 21 extends to the rear so as to cover the thin film coil 22 and form the back gap 50BG. When the main insulating layer 21 is formed, for example, the main insulating layer 21 extends from the position P3 at the rear of the position P2 to the rear, and in consideration of the fact that a distance by which the main insulating layer 21 is recessed, that is, the length of a portion of the return yoke layer 23 formed in a later step adjacent to the write shield layer 18 (distance L3) is determined on the basis of the position P2, the distance by which the main insulating layer 21 is recessed is adjusted. Thereby, the insulating layer 50 is formed so as to have a laminate structure in which the auxiliary insulating layer 20 and the main insulating layer 21 are laminated.

The details of the step of forming the main insulating layer 21 are as below. At first, the main insulating layer portion 21A is pattern-formed in a region including a region where the thin film coil 22 is formed in a later step in the flat surface HM by, for example, sputtering so as to have a thickness of approximately 0.2 μm. Next, for example, a plating film is selectively grown by a plating process so as to pattern-form the thin film coil 22 with a thickness of approximately 2.0 μm on the main insulating layer portion 21A. Finally, the main insulating layer portion 21B is pattern-formed by, for example, the same technique as that by which the insulating layer 11 is formed so as to cover the thin film coil 22 and the main insulating layer portion 21A around the thin film coil 22. Thereby, the main insulating layer 21 including the main insulating layer portions 21A and 21B is formed on the auxiliary pole layer 19 and the auxiliary insulating layer 20.

After forming the insulating layer 50 (the auxiliary insulating layer 20 and the main insulating layer 21), as shown in FIGS. 11A and 11B, the return yoke layer 23 is pattern-formed through selectively growing a plating film by, for example, a plating process so as to be connected to the write shield layer 18. The return yoke layer 23 is formed so as to extend from a position where the air bearing surface 70 is formed in a later step to the rear via the back gap 5BG. Thereby, the magnetic layer 60 is formed so as to include the write shield layer 18 and the return yoke layer 23. Thus, the recording head portion 100B is completed.

In the above description, in order to simplify the description, the recording head portion 100B is completed in the step shown in FIGS. 11A and 11B; however, strictly speaking, as shown in FIGS. 1A and 1B, the recording head portion 100B is actually completed when the air bearing surface 70 is formed in a later step.

In the method of manufacturing a thin film magnetic head according to the embodiment, the pole layer 40 has a structure in which the main pole layer 15 disposed on the leading side and the auxiliary pole layer 19 disposed on the trailing side are laminated, so at the time of recording information, the possibility of erasing recorded information without intention can be minimized because of the following reason.

Figures 18A, 18B:
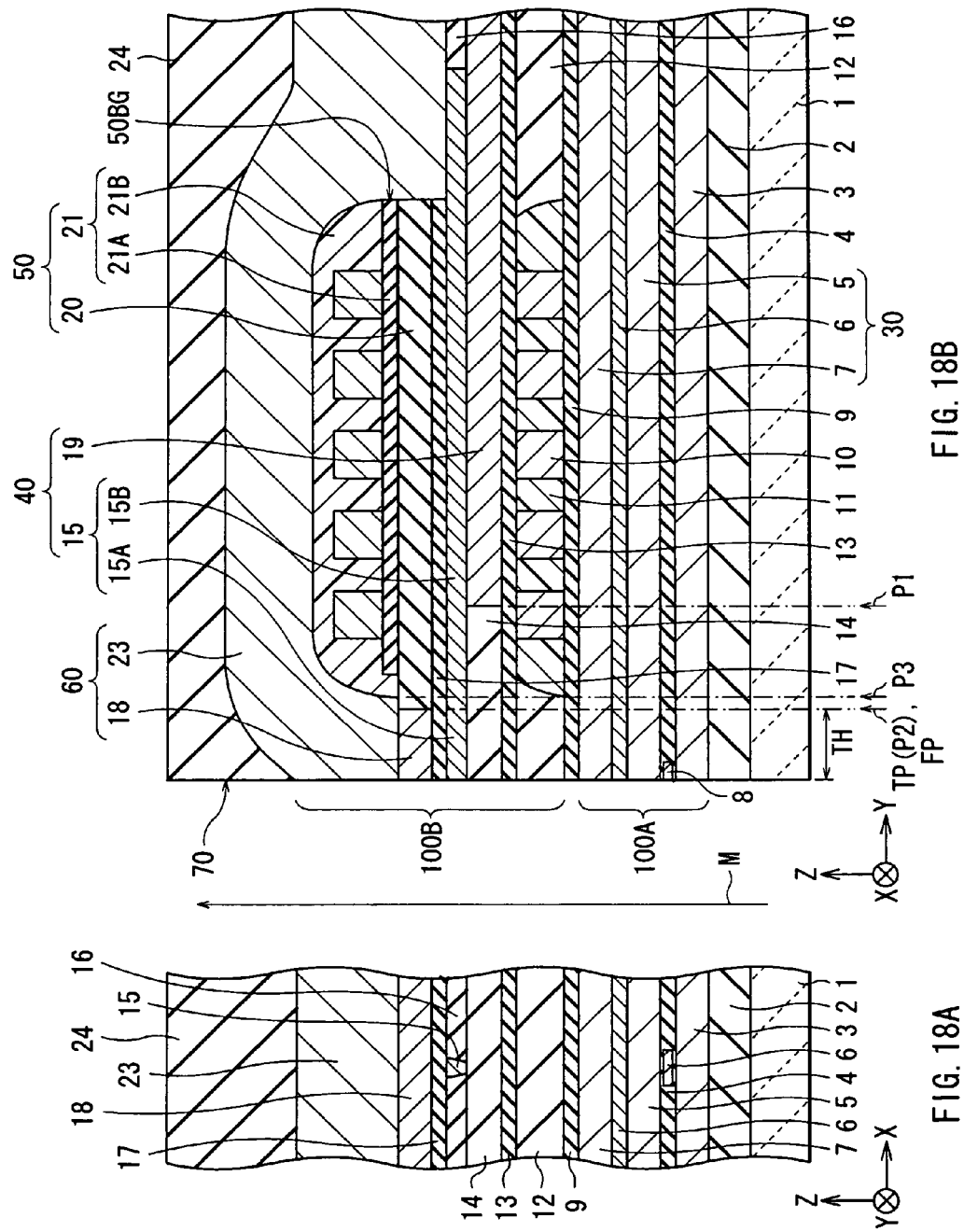
FIGS. 18A and 18B are sectional views of a thin film magnetic head according to a comparative example relative to the thin film magnetic head according to the embodiment of the invention.
Figure 19:
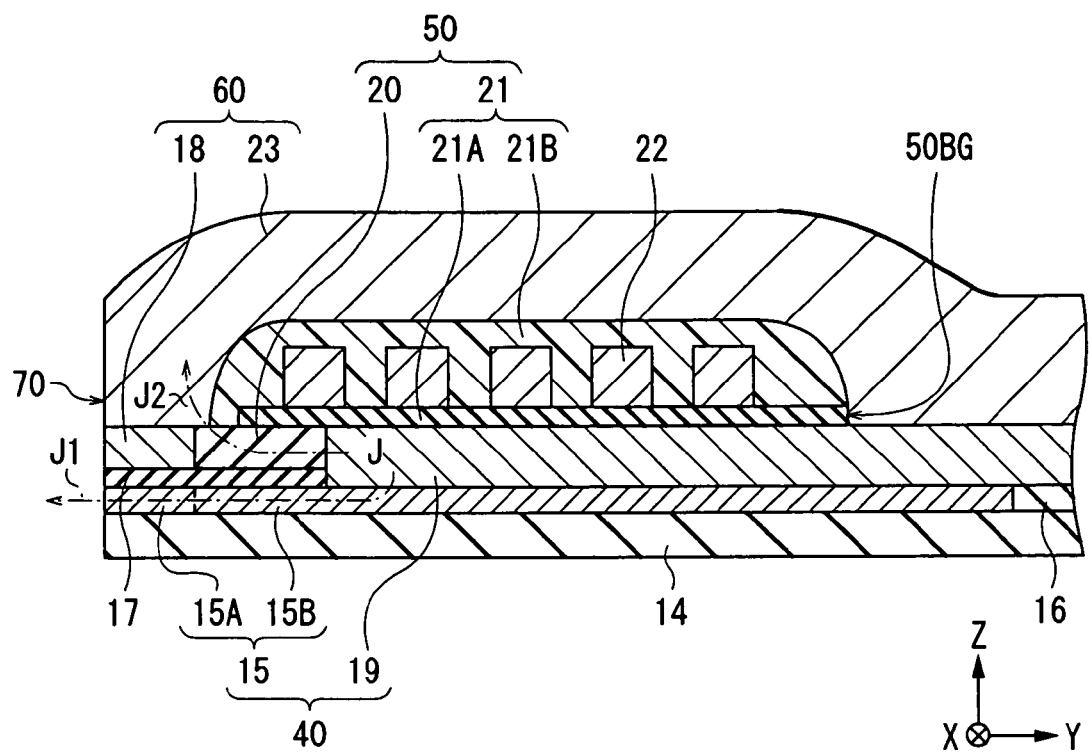
FIG. 19 is a sectional view for describing an advantage of the thin film magnetic head according to the embodiment of the invention.
Figure 20:
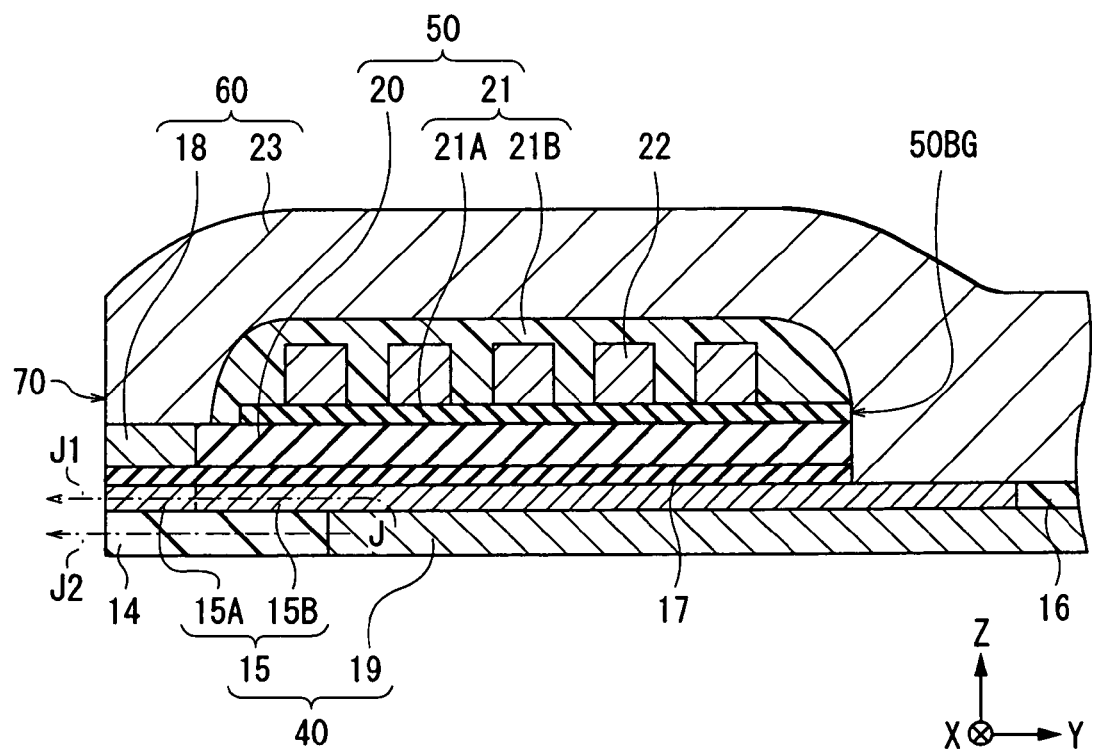
FIG. 20 is a sectional view for describing a disadvantage of the thin film magnetic head of the comparative example.

FIGS. 18A and 18B shows sectional views of a thin film magnetic head of a comparative example relative to the thin film magnetic head according to the embodiment, and correspond to FIGS. 1A and 1B. FIG. 19 is an illustration for describing an advantage of the thin film magnetic head according to the embodiment, and FIG. 20 is an illustration for describing a disadvantage of the thin film magnetic head of the comparative example. In FIGS. 19 and 20, only main parts of the thin film magnetic heads shown in FIGS. 1A and 1B and FIGS. 18A and 18B are shown. The thin film magnetic head of the comparative example shown in FIGS. 18A and 18B has the same structure as that of the thin film magnetic head according to the embodiment, except that unlike the thin film magnetic head according to the embodiment including the pole layer 40 with a structure in which the main pole layer 15 is disposed on the leading side, and the auxiliary pole layer 19 is disposed on the trailing side, the pole layer 40 has a structure in which the main pole layer 15 is disposed on the trailing side, and the auxiliary pole layer 19 is disposed on the leading side. More specifically, in the thin film magnetic head of the comparative example, as shown in FIGS. 18A and 18B, the surroundings of the auxiliary pole layer 19 is filled with the non-magnetic layer 14, and the gap layer 17 and the auxiliary insulating layer 20 extend to the rear so as not to fill the back gap 50BG.

In the thin film magnetic head of the comparative example (refer to FIGS. 18A and 18B), in the case where the magnetic layer 60 is disposed on the trailing side of the pole layer 40, because of a structural factor that the auxiliary pole layer 19 is disposed on the leading side with respect to the main pole layer 15, that is, the auxiliary pole layer 19 is disposed on a side relatively far from the magnetic layer 60, information recorded on the recording medium is easily erased without intention at the time of recording information. More specifically, in the thin film magnetic head of the comparative example, for example, as shown in FIG. 20, when the magnetic flux for recording J generated in the thin film coil 22 is contained in the auxiliary pole layer 19, a part of the magnetic flux J contained in the auxiliary pole layer 19, that is, a magnetic flux J1 is indirectly emitted from the air bearing surface 70 to the outside via the main pole layer 15, so a proper perpendicular magnetic field is generated on the basis of the magnetic flux J1. On the other hand, a remaining part of the magnetic flux J, that is, a magnetic flux J2 is directly emitted from the air bearing surface 70 to the outside not via the main pole layer 15, so an unnecessary magnetic field is also generated on the basis of the magnetic flux J2. In this case, the recording medium is magnetized by the proper perpendicular magnetic field, so information is properly recorded on the recording medium, and the recording medium is magnetized again by the unnecessary magnetic field, so information recorded on the recording medium is easily erased without intention. Thereby, in the thin film magnetic head of the comparative example, a failure that information recorded on the recording medium is erased without intention at the time of recording information easily occurs.

On the other hand, in the thin film magnetic head according to the embodiment (refer to FIGS. 1A and 1B), in the case where the magnetic layer 60 is disposed on the trailing side of the pole layer 40, on the basis of a structural characteristic that the auxiliary pole layer 19 is disposed on the trailing side with respect to the main pole layer 15, that is, auxiliary pole layer 19 is disposed on a side relatively close to the magnetic layer 60, information recorded on the recording medium is not easily erased without intention at the time of recording information. More specifically, in the thin film magnetic head according to the embodiment, for example, as shown in FIG. 19, when the magnetic flux for recording J generated in the thin film coil 22 is contained in the auxiliary pole layer 19, the magnetic flux J1 of the magnetic flux J contained in the auxiliary pole layer 19 is indirectly emitted from the air bearing surface 70 to outside via the main pole layer 15 as in the case of the thin film magnetic head of the comparative example, so a proper perpendicular magnetic field is generated on the basis of the magnetic flux J1. On the other hand, even if the remaining magnetic flux J2 is apt to be directly emitted from the air bearing surface 70 to outside not via the main pole layer 15, the magnetic flux J2 is contained in the magnetic layer 60, so the magnetic flux J2 is not easily emitted from the air bearing surface 70 to outside directly, thereby an unnecessary magnetic field is not easily generated on the basis of the magnetic flux J2. In this case, the recording medium is magnetized by the normal perpendicular magnetic field, so information is properly recorded on the recording medium, and the recording medium is not easily magnetized again by the unnecessary magnetic field, so information recorded on the recording medium is not easily erased without intention. Therefore, in the thin film magnetic head according to the embodiment, the possibility of erasing recorded information without intention at the time of recording information can be minimized.

As another technical effect on the basis of the structural characteristic of the thin film magnetic head according to the embodiment, in the thin film magnetic head according to the embodiment, as long as the auxiliary pole layer 19 is disposed on the trailing side of the main pole layer 15, an extending range of the auxiliary pole layer 19 can be freely set. More specifically, referring to FIGS. 1A and 1B, the position P1 which determines the extending range of the auxiliary pole layer 19 can be freely set between a position of a front end of the main insulating layer 21 (position P3) and a position of a rear end of the main insulating layer 21 (position P4). In the case where the position P1 is changed between the position P3 and the position P4, the possibility of erasing recorded information without intention at the time of recording information can be minimized. However, in the case where the position P1 is changed, it is necessary to note the following point. When the position P1 is too close to the position P3, as the auxiliary pole layer 19 comes too close to the magnetic layer 60, the amount of the magnetic flux J2 (refer to FIG. 19) contained in the magnetic layer 60 from the auxiliary pole layer 19 increases, that is, the amount of the magnetic flux J1 emitted from the auxiliary pole layer 19 to the air bearing surface 70 via the main pole layer 15 decreases. Therefore, the strength of the perpendicular magnetic field easily declines. On the other hand, when the position P1 is too close to the position P4, as the capacity of the auxiliary pole layer 19 becomes too small, the amount of the magnetic flux J contained in the auxiliary pole layer 19 decreases, thereby the strength of the perpendicular magnetic field easily declines. Therefore, in the thin film magnetic head according to the embodiment, in order to secure the strength of the perpendicular magnetic field while minimizing the possibility of erasing recorded information without intention, it is necessary to set the position P1 so as not to be too close to the positions P3 and P4. More specifically, in the embodiment, referring to FIGS. 1A and 1B, in the case where a distance (distance L3) between the air bearing surface 70 and the front end (position P3) of the main insulating layer 21 is 0.40 µm, and a distance between the air bearing surface 70 and the rear end (position P4) of the main insulating layer 21 is 8.0 µm, the distance (the distance L1) between the air bearing surface 70 and the front end (the position P1) of the auxiliary pole layer 19 falls within a range of 0.40 µm<L1<8.0 µm, thereby the possibility of erasing recorded information without intention at the time of recording information can be minimized. In this case, in particular, when the distance l1 is within a range of 0.8 µm<L1<7.1 µm, while minimizing the possibility of erasing recorded information without intention at the time of recording information, the strength of the perpendicular magnetic field can be secured.

Moreover, in the embodiment, the saturated magnetic flux density of the auxiliary pole layer 19 is smaller than the saturated magnetic flux density of the main pole layer 15, so on the basis of a difference between the saturated magnetic flux densities, the magnetic flux is more easily focused on the main pole layer 15 than the auxiliary pole layer 19. In this case, referring to FIG. 19, compared to the case where the saturated magnetic flux density of the auxiliary pole layer 19 is larger than the saturated magnetic flux density of the main pole layer 15, the amount of the magnetic flux J2 contained in the magnetic layer 60 from the auxiliary pole layer 19 relatively decreases, and the amount of the magnetic flux J1 emitted from the auxiliary pole layer 19, and then from the air bearing surface 70 via the main pole layer 15 relatively increases, so in this point of view, the possibility of erasing recorded information without intention at the time of recording information can be minimized, and the strength of the perpendicular magnetic field can be secured.

In the embodiment, as shown in FIG. 3, the exposed surface 15M of the main pole layer 15 from which the magnetic flux is emitted to generate a perpendicular magnetic field has a symmetrical inverted trapezoidal shape, so even if a skew occurs during the recording operation of the thin film magnetic head, that is, the main pole layer 15 is skewed toward a tangent direction of a track to be recorded (a specific track on which information is recorded) in a curve form on the recording medium, the exposed surface 15M of the main pole layer 15 does not stray from the track to be recorded to an adjacent track (another track adjacent to the track to be recorded). In this case, because of a structural factor that the exposed surface 15M has a rectangular shape, when the skew occurs, unlike the case where the exposed surface 15M strays from the track to be recorded to the adjacent track, not only the track to be recorded but also the adjacent track can be prevented from being magnetized by the perpendicular magnetic field, so information recorded on the recording medium can be prevented from being erased without intention due to the skew at the time of recording information.

In the embodiment, as shown in FIGS. 1A and 1B, a distance from the air bearing surface 70 to the main insulating layer 21, that is, a length (distance L3) of a portion of the return yoke layer 23 adjacent to the write shield layer 18 is larger than the length (distance L2) of the write shield layer 18, so as described above, when the magnetic flux is contained in the magnetic layer 60 via the air bearing surface 70, that is, when the magnetic flux contained in the write shield layer 18 flows to the return yoke layer 23 via the write shield layer 18, a magnetic path through which the magnetic flux flows in the magnetic layer 60 is gradually widened. In this case, due to a structural factor that the distance L3 is smaller than the distance L2, unlike the case where the magnetic flux flowing through the magnetic layer 60 is gradually reduced, the magnetic flux can be prevented from being saturated in the magnetic layer 60, so the magnetic flux can smoothly flow through the magnetic layer 60.

In the embodiment, as shown in FIGS. 1A and 1B, the thin film coil 22 for generating a magnetic flux for recording is disposed on the trailing side of the main pole layer 15, and the thin film coil 10 for generating a magnetic flux for leakage prevention is disposed on the leading side of the main pole layer 15 so as to prevent the leakage of the magnetic flux for recording generated in the thin film coil 22, so for example, as described above, when a current flows through the thin film coils 10 and 22 in opposite directions at the time of recording information, thereby magnetic fluxes are generated in the thin film coils 10 and 22 toward opposite directions, by an influence of an upward magnetic flux (a magnetic flux for leakage prevention) generated in the thin film coil 10, a downward magnetic flux (a magnetic flux for recording) generated in the thin film coil 22 is not easily transferred from the recording head portion 100B to the reproducing head portion 100A, so the magnetic flux for recording generated in the thin film coil 22 is not easily leaked to the reproducing head portion 100A. Therefore, the magnetic flux for recording generated in the thin film coil 22 is emitted from the air bearing surface 70 via the main pole layer 15 without loss, so in this point of view, the strength of the perpendicular magnetic field can be secured.

Moreover, in the embodiment, as shown in FIGS. 1A and 1B, as the auxiliary pole layer 19 is disposed on the trailing side of the main pole layer 15, compared to the thin film magnetic head of the comparative example in which the auxiliary pole layer 19 is disposed on the leading side of the main pole layer 15 (refer to FIGS. 18A and 18B), a distance between the reproducing head portion 100A (the MR device 8) and the recording head portion 100B (the main pole layer 15) is reduced, thereby the recording head portion 100B is disposed closer to the substrate 1 with high heat conductivity. In this case, heat generated at the time of energizing the thin film coils 10 and 22 in the recording head portion 100B is easily dissipated through the substrate 1 (radiation efficiency is improved), so for example, a failure that the main pole layer 15 is projected, that is, a failure that the main pole layer 15 is projected from the air bearing surface 70 without intention because the main pole layer 15 expands by heat can be prevented. An effect of preventing the above-described failure can be obtained in not only the main pole layer 15 but also the magnetic layer 60.

In the embodiment, as show in FIG. 3, the width W1 of the top edge E1 (the trailing edge TE) of the main pole layer 15 is 0.2 µm or less, and the square measure S of the exposed surface 60M of the magnetic layer 60 is 7 µm² or more, so the magnetic volume (the amount of the magnetic flux to be contained) of the magnetic layer 60 is sufficiently large in proximity to the air bearing surface 70. In this case, the magnetic flux after recording is not easily focused on the magnetic layer 60, so an unnecessary magnetic field is not easily generated in the magnetic layer 60. The unnecessary magnetic field in this case is a magnetic field in a direction opposite to the perpendicular magnetic field, and the unnecessary magnetic field erases a recording pattern recorded on the recording medium 90, or degrades the quality of the recording pattern. Therefore, in this point of view, information erasing without intention can be prevented. In this case, in particular, when the square measure S is 12.25 µm² or more, more specifically 70 µm² or more, the quality of the recording pattern can be secured.

In this case, in particular, where the saturated magnetic flux density of the magnetic layer 60 is X [T], the magnetic square measure of the exposed surface 60M is Y [µm²T], and the maximum value of the strength of the perpendicular magnetic field magnetizing the recording medium 90 is Z [×10³/(4π) A/m], a relationship of $Y \geq \{7X/[9000 \times 10^3/(4\pi)]\} \times Z$ is established, so the magnetic square measure of the exposed surface 60M is set depending upon the maximum value of the strength of the perpendicular magnetic field, thereby information erasing without intention can be prevented.

In particular, in addition to the above description, in the method of manufacturing a thin film magnetic head according to the embodiment, in order to manufacture the thin film magnetic head including the pole layer 40 in which the main pole layer 15 is disposed on the leading side, and the auxiliary pole layer 19 is disposed on the trailing side, only existing thin film processes including film forming techniques, patterning techniques and etching techniques are used, and a novel and complicated manufacturing process is not used. Therefore, in the embodiment, the thin film magnetic head which can minimize the possibility of erasing information recorded on the recording medium without intention at the time of recording information can be easily manufactured through the use of only existing thin film processes.

In the embodiment, as shown in FIGS. 1A and 1B, as the main pole layer 15 is formed on the non-magnetic layer 14, so because of the following reason, compared to the case where the thin film magnetic head of the comparative example shown in FIGS. 18A and 18B is manufactured, a plurality of thin film magnetic heads can be stably manufactured so as to have substantially uniform recording performance.

Figure 21:
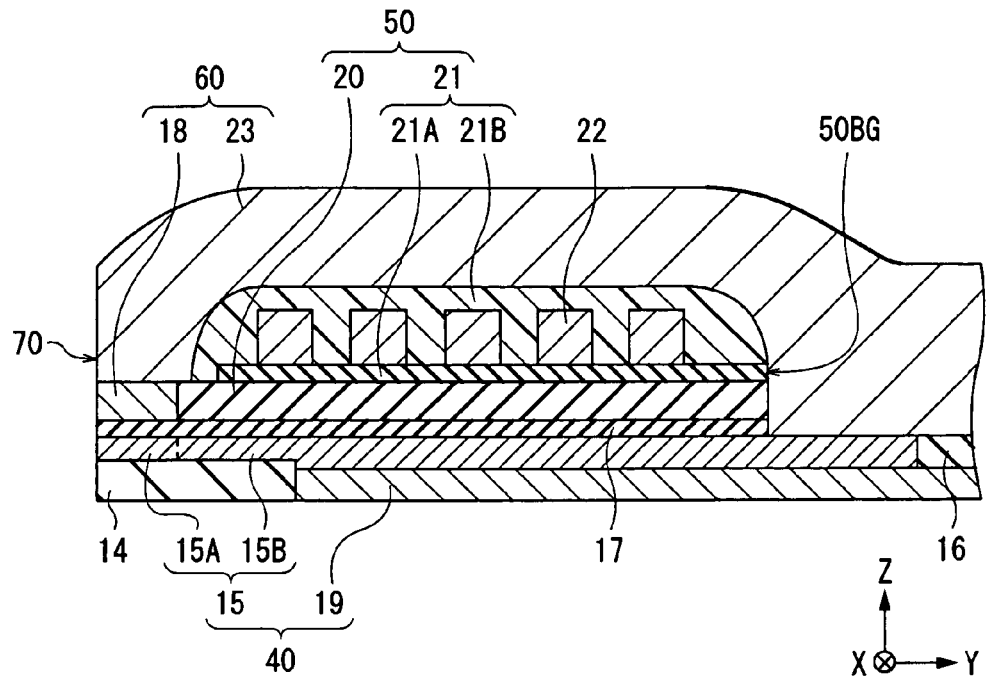
FIG. 21 is a sectional view for describing another disadvantage of the thin film magnetic head of the comparative example.

FIG. 21 is an illustration for describing a disadvantage in the case where the thin film magnetic head of the comparative example is manufactured, and corresponds to FIG. 20. In the case where the thin film magnetic head of the comparative example is manufactured, as the non-magnetic layer 14 and the auxiliary pole layer 19 form the base of the main pole layer 15, when the non-magnetic layer 14 and the auxiliary pole layer 19 are polished by, for example, the CMP method to planarize them before forming the main pole layer 15, as shown in FIG. 21, the non-magnetic layer 14 and the auxiliary pole layer 19 are not planarized due to a difference between the polishing speeds of the non-magnetic layer 14 and the auxiliary pole layer 19, that is, a step between the non-magnetic layer 14 and the auxiliary pole layer 19 is easily generated. FIG. 21 shows, for example, the case where the auxiliary pole layer 19 is polished more than the non-magnetic layer 14, because the polishing speed of the auxiliary pole layer 19 is faster than that of the non-magnetic layer 14. When a step is generated between the non-magnetic layer 14 and the auxiliary pole layer 19, a step is generated in the main pole layer 15 due to the step, so a difference between the thickness of the front portion and the thickness of the rear portion in the main pole layer 15 is easily generated. FIG. 21 shows a state where after the main pole layer 15 is formed on the non-magnetic layer 14 and the auxiliary pole layer 19, the main pole layer 15 is planarized through polishing the main pole layer 15 by, for example, the CMP method. In this case, for example, when a plurality of thin film magnetic heads are formed on a wafer by one operation, the thickness of the main pole layer 15 varies between a series of the thin film magnetic heads, so recording performance varies between the series of the thin film magnetic heads. More specifically, for example, even if a difference in the thickness of the main pole layer 15 between a series of thin film magnetic heads is approximately 0.05 µm, when the target thickness of the main pole layer 15 is approximately 0.25 µm, a difference in the thickness of the main pole layer 15 (=approximately 0.05 µm) represents 20% of the target thickness (=approximately 0.25 µm), so due to a difference in the capacity of the main pole layer 15 (that is, the amount of the magnetic flux to be contained) between the thin film magnetic heads, recording performance typified by, for example, overwrite characteristics varies between the series of thin film magnetic heads. Thereby, in the case where the thin film magnetic head of the comparative example is manufactured, it is difficult to stably manufacture a plurality of thin film magnetic heads so as to have substantially uniform recording performance.

On the other hand, in the case where the thin film magnetic head according to the embodiment is manufactured, as only the non-magnetic layer 14 forms the base of the main pole layer 15, before forming the main pole layer 15, the non-magnetic layer 14 is polished by, for example, the CMP method to be planarized, thereby unlike the case of the comparative example in which a step is easily generated between the non-magnetic layer 14 and the auxiliary pole layer 19, as shown in FIG. 19, the non-magnetic layer 14 is appropriately planarized, so the thickness of the main pole layer 15 is substantially uniform. In this case, for example, in the case where a plurality of thin film magnetic heads are formed on a wafer by one operation, the thickness of the main pole layer 15 in each thin film magnetic head is substantially uniform, so recording performance is substantially uniform between a series of thin film magnetic heads. Thereby, the capacity of the main pole layer 15 (that is, the amount of the magnetic flux to be contained) is substantially uniform in each thin film magnetic head, so the recording performance typified by, for example, the overwrite characteristics is substantially uniform between the series of thin film magnetic heads. Therefore, in the embodiment, a plurality of thin film magnetic heads can be stably manufactured so as to have substantially uniform recording performance. In this case, in particular, a plurality of main pole layers 15 can be formed so as to have a substantially uniform thickness with high precision, so variations in the flare points FP between the main pole layers 15 can be prevented.

In the embodiment, as shown in FIGS. 1A and 1B, as the auxiliary pole layer 19 is formed on the main pole layer 15, compared to the thin film magnetic head of the comparative example shown in FIGS. 18A and 18B, the saturated magnetic flux density can be appropriately set because of the following reason.

Figure 22:
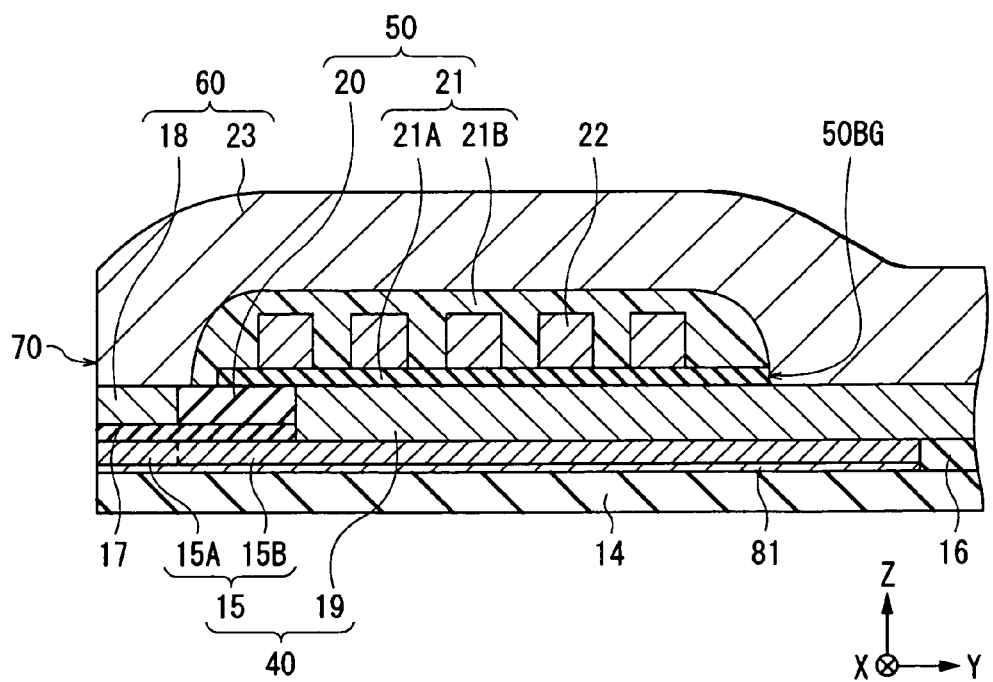
FIG. 22 is a sectional view for describing another advantage of the thin film magnetic head according to the embodiment of the invention.
Figure 23:
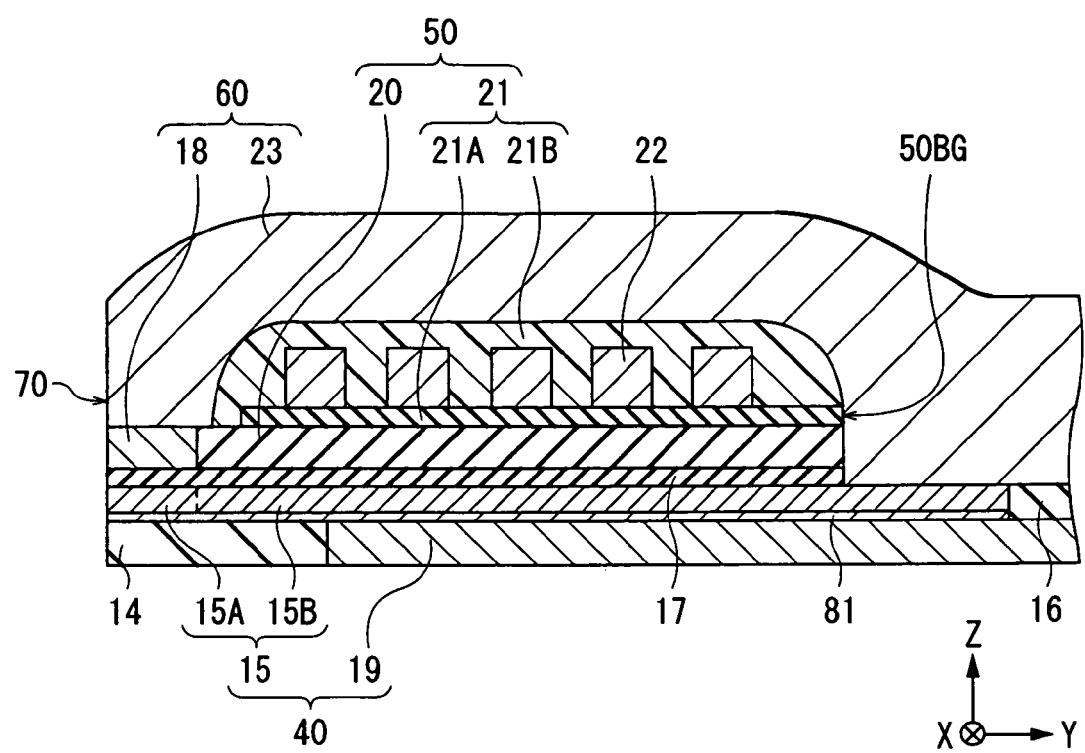
FIG. 23 is a sectional view for describing still another disadvantage of the thin film magnetic head of the comparative example.

FIG. 22 is an illustration for describing an advantage in the case where the thin film magnetic head according to the embodiment is manufactured, and corresponds to FIG. 19. FIG. 23 is an illustration for describing a disadvantage in the case where the thin film magnetic head of the comparative example is manufactured, and corresponds to FIG. 20. In FIGS. 22 and 23, the seed layer 81 described referring to FIGS. 12 through 17 is shown. In the case where the thin film magnetic head of the comparative example is manufactured, as the main pole layer 15 is formed on the auxiliary pole layer 19, as shown in FIG. 23, when the main pole layer 15 is formed through selectively growing a plating film through the use of the seed layer 81, the seed layer 81 is sandwiched between the auxiliary pole layer 19 and the main pole layer 15. In this case, in order to magnetically connect the auxiliary pole layer 19 and the main pole layer 15 to each other, the material of the seed layer 81 is limited to a magnetic material, so it is difficult to appropriately set the saturated magnetic flux density of the main pole layer 15. More specifically, in order to set the actual saturated magnetic flux density of the main pole layer 15 so as to be sufficiently high, it is preferable to determine the actual saturated magnetic flux density of the main pole layer 15 on the basis of only the saturated magnetic flux density of the material of the main pole layer 15, so it is desired to use a non-magnetic material which does not contribute to the actual saturated magnetic flux density of the main pole layer 15 as the material of the seed layer 81; however, when the seed layer 81 is sandwiched between the auxiliary pole layer 19 and the main pole layer 15, as described above, the material of the seed layer 81 is limited to a magnetic material. In other words, in the case where the main pole layer 15 is formed by, for example, a plating process, in order to make the growth distribution of a plating film uniform, it is necessary for the thickness of the seed layer 81 to be approximately 0.05 μm at the minimum; however, in the case where the thickness of the main pole layer 15 is approximately 0.25 μm, the thickness of the seed layer 81 represents 20% of the thickness of the main pole layer 15. In this case, for example, when the seed layer 81 is made of a magnetic material which can easily form a thin film such as Permalloy, the saturated magnetic flux density of the seed layer 81 (for example, Permalloy) is lower than the saturated magnetic flux density of the main pole layer 15 (for example, an iron-based alloy), so the actual saturated magnetic flux density of the main pole layer 15 declines. Thereby, in the case where the thin film magnetic head of the comparative example is manufactured, it is difficult to appropriately set the saturated magnetic flux density of the main pole layer 15.

On the other hand, in the case where the thin film magnetic head according to the embodiment is manufactured, as the auxiliary pole layer 19 is formed on the main pole layer 15, as shown in FIG. 22, when the main pole layer 15 is formed through selectively growing a plating film through the use of the seed layer 81, the seed layer 81 is not sandwiched between the auxiliary pole layer 19 and the main pole layer 15. In this case, unlike the case of the comparative example in which the material of the seed layer 81 is limited to a magnetic material in order to magnetically connect the auxiliary pole layer 19 and the main pole layer 15 to each other, the material of the seed layer 81 is not limited to a magnetic material, so the saturated magnetic flux density of the main pole layer 15 can be appropriately set. More specifically, when the seed layer 81 is made of a non-magnetic material which does not contribute to the actual saturated magnetic flux density of the main pole layer 15, the actual saturated magnetic flux density is determined only on the basis of the saturated magnetic flux density of the material of the main pole layer 15, so the actual saturated magnetic flux density of the main pole layer 15 can be set to be sufficiently high. Therefore, in the case where the thin film magnetic head according to the embodiment is manufactured, the saturated magnetic flux density of the main pole layer 15 can be appropriately set.

In the embodiment, as shown in FIGS. 9A and 9B, the write shield layer 18 and the auxiliary pole layer 19 are formed at the same time in a single step; however, the embodiment is not specifically limited to this. For example, the write shield layer 18 and the auxiliary pole layer 19 may be separately formed in separate steps. The same effects as those in the embodiment can be obtained even in this case.

This is the end of the descriptions about the thin film magnetic head including a perpendicular magnetic recording head and the method of manufacturing the thin film magnetic head according to the embodiment.

Figure 24:
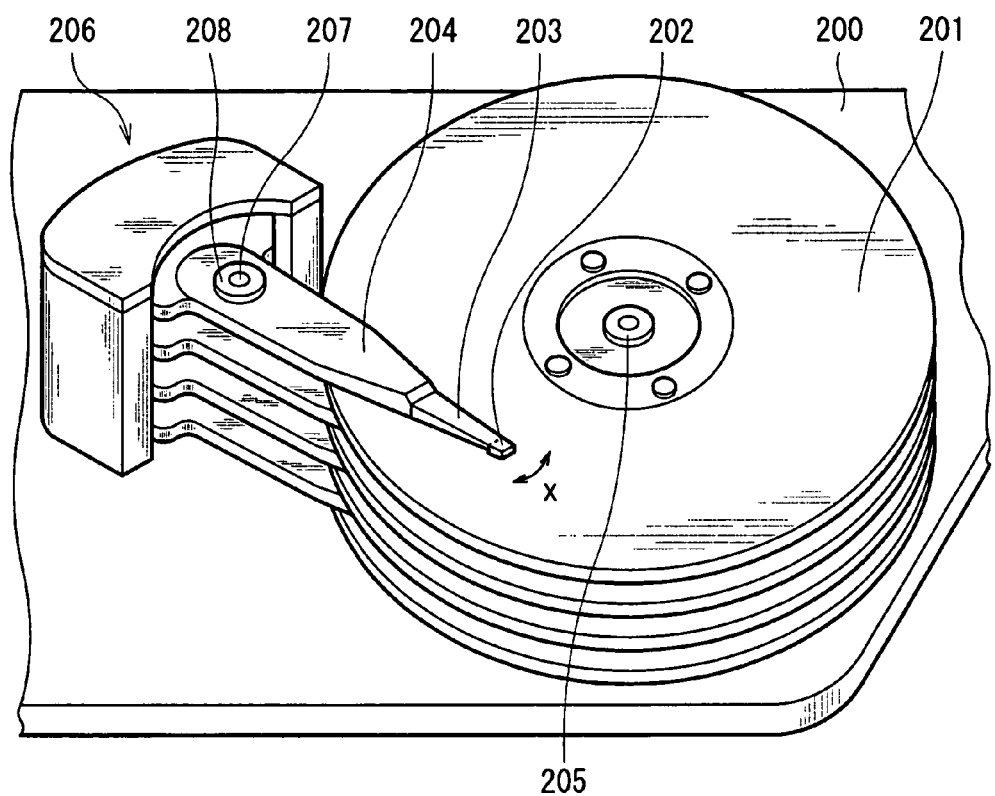
FIG. 24 is a perspective view of a magnetic recording apparatus including the thin film magnetic head according to the embodiment of the invention.
Figure 25:
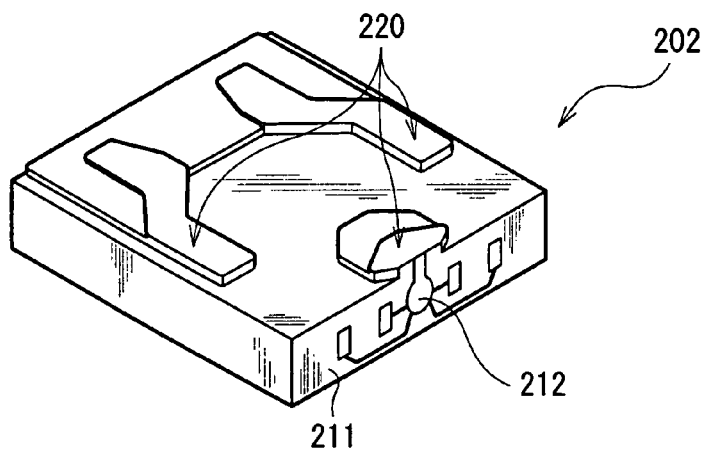
FIG. 25 is an enlarged perspective view of a main part of the magnetic recording apparatus shown in FIG. 24.

Next, referring to FIGS. 24 and 25, the structure of a magnetic recording apparatus including the perpendicular magnetic recording head according to the embodiment of the invention will be described below. FIG. 24 shows a perspective view of the magnetic recording apparatus, and the FIG. 25 shows an enlarged perspective view of a main part of the magnetic recording apparatus. The magnetic recording apparatus includes the thin film magnetic head described in the above embodiment, and the magnetic recording apparatus is, for example, a hard disk drive.

As shown in FIG. 24, the magnetic recording apparatus includes a plurality of magnetic disks (for example, hard disks) 201 as recording media 90 (refer to FIG. 4) on which information is magnetically recorded, a plurality of suspensions 203 each of which is disposed so as to correspond to each magnetic disk 201 and supports a magnetic head slider 202 in an end portion, and a plurality of arms 204 each of which supports the other end of each suspension 203 in an enclosure 200. The magnetic disks 201 are rotatable about a spindle motor 205 fixed on the enclosure 200 as a center. The arms 204 are connected to a driving portion 206 as a power source, and are pivotable about a fixed shaft 207 fixed on the enclosure 200 as a center through a bearing 208. The driving portion 206 includes, for example, a driving source such as a voice coil motor. The magnetic recording apparatus is a model in which the plurality of arms 204 integrally pivot about the fixed shaft 207 as a center. In order to easily show an internal structure of the magnetic recording apparatus, in FIG. 24, the enclosure 200 is partially cut away.

As shown in FIG. 25, the magnetic head slider 202 has a structure in which a thin film magnetic head 212 performing a recording process and a reproducing process is disposed on a surface of a substantially-rectangular-shaped substrate 211 made of, for example, a non-magnetic insulating material such as AlTiC. The substrate 211 has an uneven surface (the air bearing surface 220) so as to reduce air resistance generated when the arms 202 pivot, and the thin film magnetic head 212 is disposed on another surface of the substrate 211 (in FIG. 25, a surface on a right front side) orthogonal to the air bearing surface 220. The thin film magnetic head 212 has, for example, the structure described in the above embodiment. When the magnetic disk 201 rotates at the time of recording or reproducing information, an air flow occurs between a recording surface of the magnetic disk 201 (a surface facing the magnetic head slider 202) and the air bearing surface 220, and the magnetic head slider 202 is floated from the recording surface of the magnetic disk 201 by the airflow. In order to easily show a structure of the head slider 202 on a side closer to the air bearing surface 220, FIG. 25 shows the magnetic head slider 202 turned upside down from a state of FIG. 24.

In the magnetic recording apparatus, the arm 204 pivots during recording or reproducing information so that the magnetic head slider 202 moves to a predetermined region (recording region) of the magnetic disk 201. Then, when the thin film magnetic head 212 is electrically conducted in a state of facing the magnetic disk 201, the thin film magnetic head 212 is operated on the basis of the principle of operation described in the above embodiment so as to perform a recording process or a reproducing process on the magnetic disk 201.

In the magnetic recording apparatus, as the thin film magnetic head 212 with structural characteristics described in the above embodiment is included, as described above, information recorded on the magnetic disk 201 is not easily erased without intention. Therefore, as the magnetic recording apparatus includes the thin film magnetic head 212, in the magnetic recording apparatus, the possibility of erasing recorded information without intention at the time of recording information can be minimized.

Structures, actions, functions, effects and modifications of the thin film magnetic head 212 included in the magnetic recording apparatus are equivalent to those in the embodiment, so they will not be further described.

EXAMPLE

Next, an example of the invention will be described below.

When recording characteristics of the thin film magnetic head described in the above embodiment (refer to FIGS. 1A and 1B through 4) were examined through including the thin film magnetic head in the magnetic recording apparatus (refer to FIGS. 24 and 25) to perform a recording process, the following results were obtained.

Firstly, when the strength of a perpendicular magnetic field was examined, the result shown in Table 1 was obtained. Table 1 shows a simulation result of the strength of a perpendicular magnetic field (magnetic field strength H; $10^3/(4\pi)$A/m=Oe). When the strength of the perpendicular magnetic field was examined, as the dimensions of the thin film magnetic head, the thickness of the gap layer was 0.05 µm, the thickness of the auxiliary pole layer was 0.5 µm, the distance (distance L1) by which the auxiliary pole layer is recessed was 3.0 µm, the thickness of the write shield layer was 0.45 µm, and the length (distance L2) of the write shield layer was 0.25 µm, and as operating conditions of the thin film magnetic head, a current supplied to the thin film coil was 0.03 A, and the number of turns of the thin film coil was 5 T (turns), thereby a magnetomotive force was 0.15 AT. When the strength of the perpendicular magnetic field in the thin film magnetic head according to the embodiment was examined, in order to make a comparative evaluation, the strength of a perpendicular magnetic field in the thin film magnetic head of the comparative example shown in FIGS. 18A and 18B was examined under the same conditions. In Table 1, the strength of the perpendicular magnetic field in the thin film magnetic head of the comparative example is also shown.

TABLE 1

| | MAGNETIC FIELD STRENGTH H ($10^3/(4\pi)$A/m) |
|---|---|
| EMBODIMENT | 10991 |
| COMPARATIVE EXAMPLE | 10948 |

It was obvious from the simulation results shown in Table 1 that the strength of the perpendicular magnetic field (magnetic field strength H) in the thin film magnetic head according to the embodiment was larger than that of the thin film magnetic head of the comparative example. More specifically, the magnetic field strength H in the thin film magnetic head of the comparative example was $10948\times10^3/(4\pi)$A/m, and the magnetic field strength H in the thin film magnetic head according to the embodiment was $10991\times10^3/(4\pi)$A/m.

Therefore, it was confirmed that in the thin film magnetic head according to the embodiment, when the auxiliary pole layer was disposed on the trailing side of the main pole layer, the strength of the perpendicular magnetic field was secured.

Figure 26:
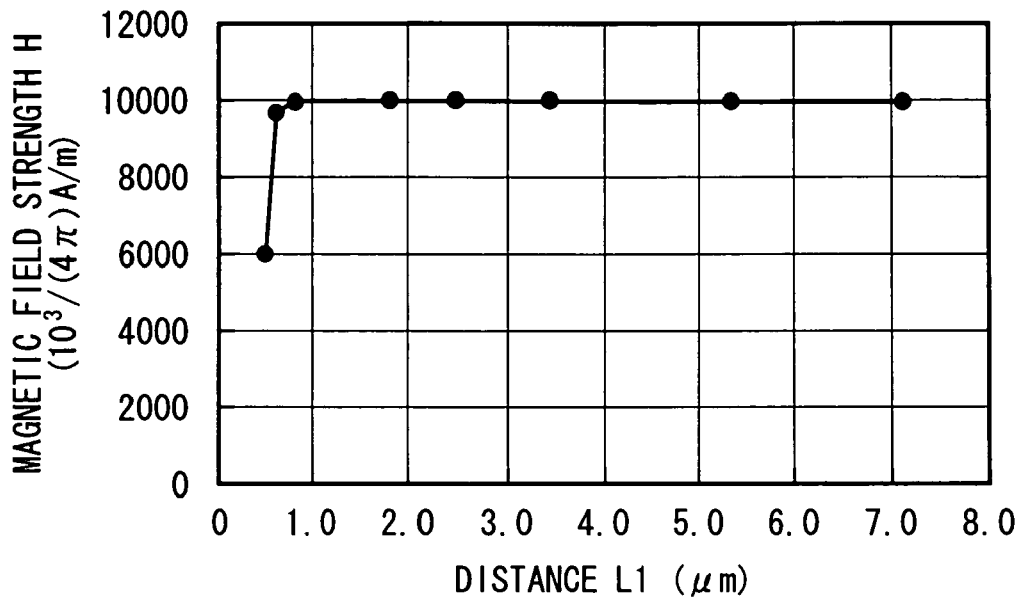
FIG. 26 is a plot showing a correlation between the strength of a perpendicular magnetic field and a distance by which an auxiliary pole layer is recessed.
Figure 27:
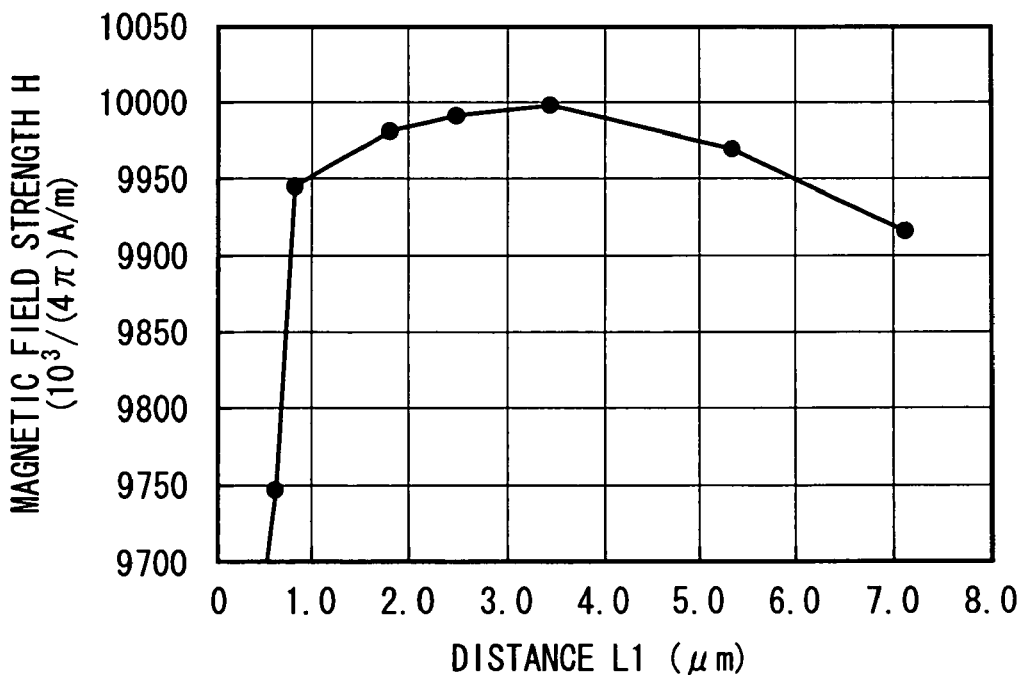
FIG. 27 is an enlarged plot showing a part of the correlation between the strength of the perpendicular magnetic field and the distance by which the auxiliary pole layer is recessed shown in FIG. 26.

Secondly, when a correlation between the strength of the perpendicular magnetic field and the distance by which the auxiliary pole layer was recessed was examined, the results shown in FIGS. 26 and 27 were obtained. FIGS. 26 and 27 show a correlation between the strength of the perpendicular magnetic field and the distance of the auxiliary pole layer, and the horizontal axis indicates the distance by which the auxiliary pole layer was recessed, that is, the distance L1 shown in FIGS. 1A and 1B, and the vertical axis indicates the strength of the perpendicular magnetic field (magnetic field strength H; $10^3/(4\pi)$A/m). The correlation shown in FIG. 27 shows an enlarged part (a range of the magnetic field strength H=9700×$10^3/(4\pi)$A/m to 10050×$10^3/(4\pi)$A/m). When the correlation between the strength of the perpendicular magnetic field and the distance by which the auxiliary pole layer was recessed was examined, as the dimensions of the thin film magnetic head, the thickness of the gap layer was 0.05 µm, the thickness of the auxiliary pole layer was 0.5 µm, the distance (distance L1) by which the auxiliary pole layer was recessed was 0.6 µm to 7.1 µm, the thickness of the write shield layer was 0.45 µm, the length of the write shield layer (distance L2) was 0.25 µm, and the distance (distance L3) by which the main insulating layer was recessed was 0.40 µm, and as the operating conditions of the thin film magnetic head, a current supplied to the thin film coil was 0.03 A, the number of turns of the thin film coil was 4 T (turns), thereby the magnetomotive force was 0.12 AT. The distance (distance L1) by which the auxiliary pole layer is recessed will be described referring to FIGS. 1A and 1B. When the distance L1 was 0.4 µm, the front end of the auxiliary pole layer was placed in the position P3, and when the distance L1 was 8.0 µm, the front end of the auxiliary pole layer was placed in the position P4.

It was obvious from FIG. 26 that when the distance L1 was within a range from 0.6 µm to 7.1 µm, the magnetic field strength H was sufficiently large within a range of the distance L1=0.8 µm or more. More specifically, the magnetic field strength H within a range of the distance L1=0.8 µm or more was approximately 9900×$10^3/(4\pi)$A/m or more. In this case, in particular, when the magnetic field strength H was more specifically examined within a range of the distance L1=0.8 µm or more, as shown in FIG. 27, the magnetic field strength H changed so as to draw an upward convex curve, and at the distance L1=3.4 µm, the magnetic field strength H was at its maximum (the magnetic field strength H=9999×$10^3/(4\pi)$A/m). Therefore, it is confirmed that in the thin film magnetic head according to the embodiment of the invention, the strength of the perpendicular magnetic field was secured within a range of the distance L1=0.8 µm to 7.1 µm. Moreover, it was confirmed that in the thin film magnetic head according to the embodiment, as the strength of the perpendicular magnetic field was secured as described above, the possibility of erasing information recorded on the recording medium without intention at the time of recording information could be minimized.

Thirdly, when a relationship between the structure of the magnetic layer and information erasing without intention was examined, the following results were obtained.

Figure 28:
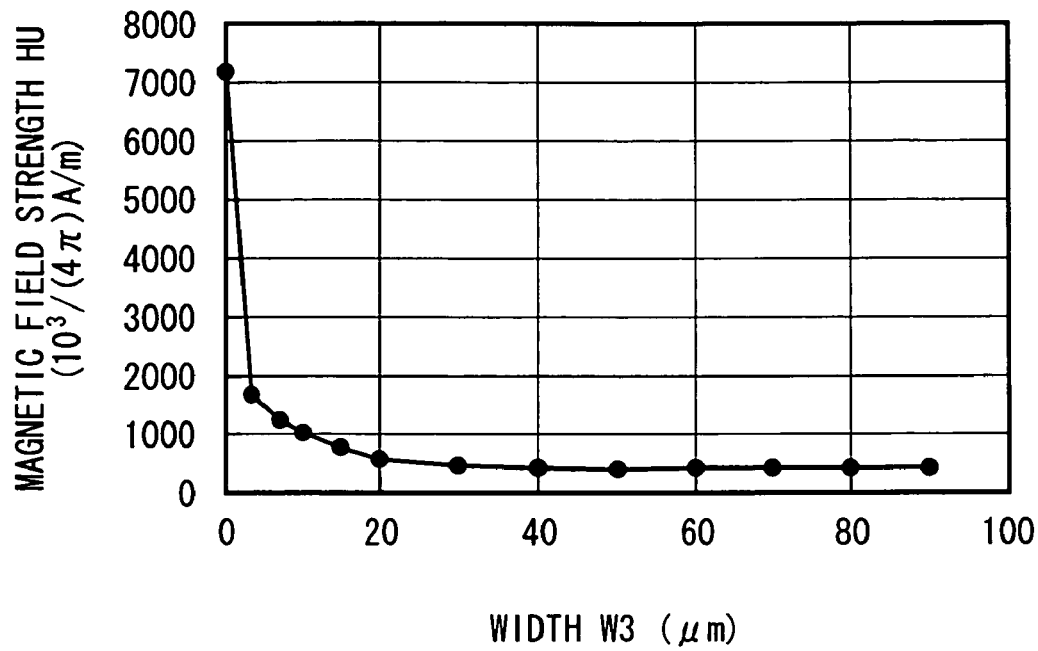
FIG. 28 is a plot showing a correlation between the strength of an unnecessary magnetic field and the width of an exposed surface of a magnetic layer.
Figure 29:
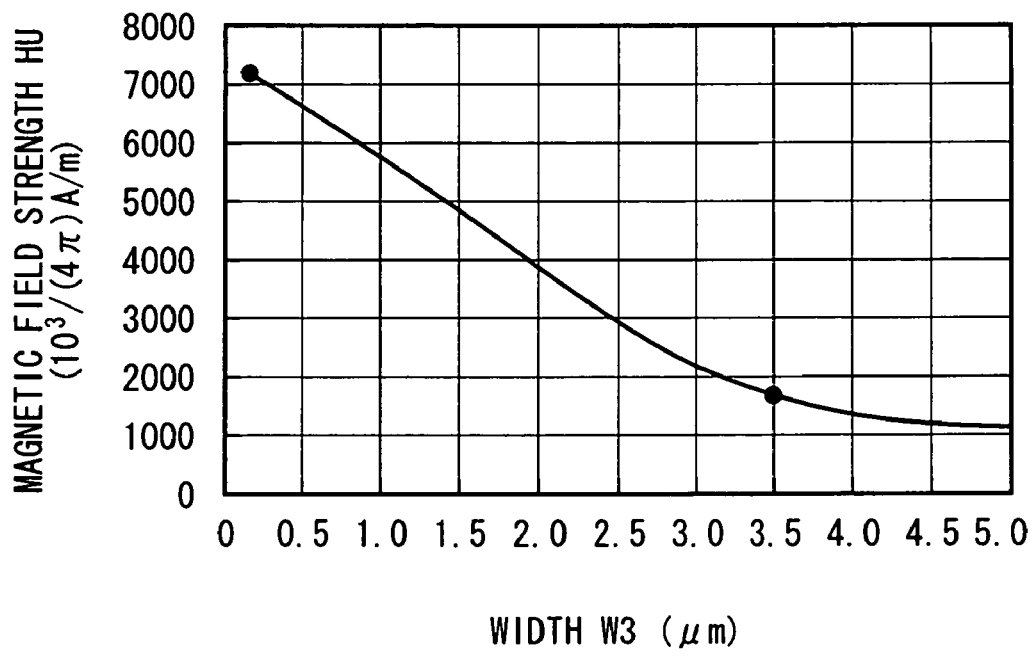
FIG. 29 is an enlarged plot showing a part of the correlation between the strength of the unnecessary magnetic field and the width of the exposed surface of the magnetic layer shown in FIG. 28.

At first, when the influence of the width of the exposed surface of the magnetic layer on information erasing without intention was examined, the results shown in FIGS. 28 and 29 were obtained. FIGS. 28 and 29 show a correlation between the strength of an unnecessary magnetic field and the width of the exposed surface of the magnetic layer, and the horizontal axis indicates the width W3 (μm) of the exposed surface of the magnetic layer, and the vertical axis indicates the strength of the unnecessary magnetic field (magnetic field strength HU; $10^3/(4\pi)$A/m). The correlation shown in FIG. 29 is an enlarged part of the correlation shown in FIG. 28 (within a range of the width W3=0 μm to 5.0 μm). When the influence of the width of the exposed surface of the magnetic layer on information erasing without intention was examined, as the dimensions of the thin film magnetic head, the width W1 of the top edge (trailing edge) in the exposed surface of the main pole layer was 0.2 μm, the width W3 of the exposed surface of the magnetic layer was 0.2 μm to 90 μm, and the height H3 of the exposed surface of the magnetic layer was 3.5 μm, and the coercivity Hc of the recording medium was $4000\times10^3/(4\pi)$ A/m.

It was obvious from the results shown in FIG. 28 that as the width W3 increased, the magnetic field strength HU sharply decreased, and then became substantially constant. More specifically, the magnetic field strength HU was at its maximum ($7139\times10^3/(4\pi)$A/m) at the width W3=0.2 μm; however, within a range of the width W3=20 μm or more, the magnetic field strength HU was substantially constant (from $372\times10^3/(4\pi)$A/m to $550\times10^3/(4\pi)$A/m). The results indicated that as the width W3 increased, the magnetic volume of the magnetic layer in the vicinity of the air bearing surface increased, so the magnetic flux after recording was not easily focused on the magnetic layer.

On the basis of the changing trend of the magnetic field strength HU shown in FIG. 28, an appropriate range of the width W3 in which information erasing without intention due to a phenomenon that the magnetic flux after recording was focused on the magnetic layer could be prevented was estimated through the use of the results shown in FIG. 29. More specifically, the coercivity Hc of the recording medium was $4000\times10^3/(4\pi)$A/m, so in order to prevent information erasing without intention in the recording medium, when the range of the width W3 in which the magnetic field strength HU was smaller than $4000\times10^3/(4\pi)$A/m was determined, the range of the width W3 was 2.0 μm or more. In this case, in particular, the rate of decrease in the magnetic field strength HU was largely decreased within a range of the width W3=3.5 μm or more, and the magnetic field strength HU was substantially constant within a range of the width W3=20 μm or more.

Next, when the influence of the width and the thickness of the exposed surface of the magnetic layer on information erasing without intention was examined, the results shown in Tables 2 and 3 were obtained. Table 2 shows a correlation between the strength of an unnecessary magnetic field (the magnetic field strength HU) and the width (width W3) of the exposed surface of the magnetic layer, and Table 3 shows a correlation between the strength of the unnecessary magnetic field (magnetic field strength HU) and the height (height H3) of the exposed surface of the magnetic layer. When the influence of the width of the exposed surface of the magnetic layer on information erasing without intention was examined, as the dimensions of the thin film magnetic head, the width W3 of the exposed surface of the magnetic layer was 90 μm or 45 μm, and the height H3 of the exposed surface of the magnetic layer was 3.5 μm. Moreover, when the influence of the height of the exposed surface of the magnetic layer on information erasing without intention was examined, as the dimensions of the thin film magnetic head, the height H3 of the exposed surface of the magnetic layer was 3.5 μm or 1.75 μm, and the width W3 of the exposed surface of the magnetic layer was 90 μm. Conditions except for the above conditions were the same as those in the case shown in FIGS. 28 and 29. The magnetic field strength HU (refer to Table 2) when the width W3 was 90 μm and the magnetic field strength HU (refer to table 3) when the height H was 3.5 μm were $372\times10^3/(4\pi)$A/m.

TABLE 2

| WIDTH W3 (μm) | MAGNETIC FIELD STRENGTH HU ($10^3/(4\pi)$A/m) |
|---|---|
| 90 | 372 |
| 45 | 416 |

TABLE 3

| HEIGHT H3 (μm) | MAGNETIC FIELD STRENGTH HU ($10^3/(4\pi)$A/m) |
|---|---|
| 3.5 | 372 |
| 1.75 | 463 |

It was obvious from the results shown in Table 2 that when the width W3 was reduced to half, the magnetic field strength HU increased. More specifically, when the width W3 was changed from 90 μm to 45 μm, the magnetic field strength HU was changed from $372\times10^3/(4\pi)$A/m to $416\times10^3/(4\pi)$A/m. On the other hand, it was obvious from the results shown in Table 3 that when the height H3 was reduced to half, the magnetic field strength HU increased. More specifically, when the height H3 was changed from 3.5 μm to 1.75 μm, the magnetic field strength HU was changed from $372\times10^3/(4\pi)$A/m to $463\times10^3/(4\pi)$A/m. Therefore, in the case where either the width W3 or the height H3 was changed, the magnetic field strength HU was substantially the same value, so it was confirmed that the magnetic field strength HU was dependent upon the square measure of the exposed surface of the magnetic layer.

Finally, when the influence of the square measure of the exposed surface of the magnetic layer on information erasing without intention was examined, the results shown in FIG. 30 were obtained. FIG. 30 shows a correlation between the strength of an unnecessary magnetic field and the square measure of the exposed surface of the magnetic layer, and the horizontal axis indicates the square measure S (μm$^2$) of the exposed surface of the magnetic layer, and the vertical axis indicates the strength of the unnecessary magnetic field (magnetic field strength HU). When the influence of the square measure of the exposed surface of the magnetic layer on information erasing without intention was examined, as the dimensions of the thin film magnetic head, the square measure S of the exposed surface of the magnetic layer was 0.7 μm$^2$ to 315 μm$^2$. Conditions except for the above condition were the same as those in the case shown in FIGS. 28 and 29.

It was obvious from the results shown in FIG. 30 that the magnetic field strength HU was changed in the same manner as the magnetic field strength HU shown in FIG. 28. In other words, as the square measure S increased, the magnetic field strength HU was sharply decreased, and then became substantially constant.

On the basis of the appropriate range of the width W3 estimated from FIG. 28, the appropriate range of the square measure S in which information erasing without intention due to a phenomenon that the magnetic flux after recording was focused on the magnetic layer could be prevented was estimated through the use of the results shown in FIG. 30. More specifically, the square measures S corresponding to the width W3=2.0 μm or more, 3.5 μm or more, and 20 μm or more were 7 μm$^2$ or more, 12.25 μm$^2$ or more, and 70 μm$^2$ or more, respectively. Therefore, it was confirmed that in the thin film magnetic head according to the embodiment of the invention, when the square measure S of the exposed surface of the magnetic layer was 7 µm² or more, preferably 12.25 µm² or more, and more preferably 70 µm² or more, information erasing without intention could be prevented.

In this case, in particular, when a relationship between the magnetic square measure of the magnetic layer and the strength of the perpendicular magnetic field was examined on the basis of the above range of the square measure S of the exposed surface of the magnetic layer, the following relationship was established. When the saturated magnetic flux density of the magnetic layer was X [T], and the magnetic square measure of the exposed surface of the magnetic layer was Y [µm²T], the lower limit of the square measure S necessary to prevent information erasing without intention was 7 µm², so the lower limit of the magnetic square measure Y was 7X [µm²T]. Moreover, when the maximum value of the strength of the perpendicular magnetic field in the case shown in FIG. 30 was examined, it was 9000 [×10³/(4π)A/m]. Therefore, in the case where the maximum value of the strength of the perpendicular magnetic field was 9000 [×10³/(4π)A/m], when the magnetic square measure Y was 7X [µm²T] or more, information erasing without intention could be prevented, so in the case where the maximum value of the strength of the perpendicular magnetic field was Z [×10³/(4π)A/m], when the magnetic square measure Y was set so as to establish a relationship of Y≧{7X/[9000×10³/(4π)]}×Z, information erasing without intention could be prevented.

Figures 31A, 31B:
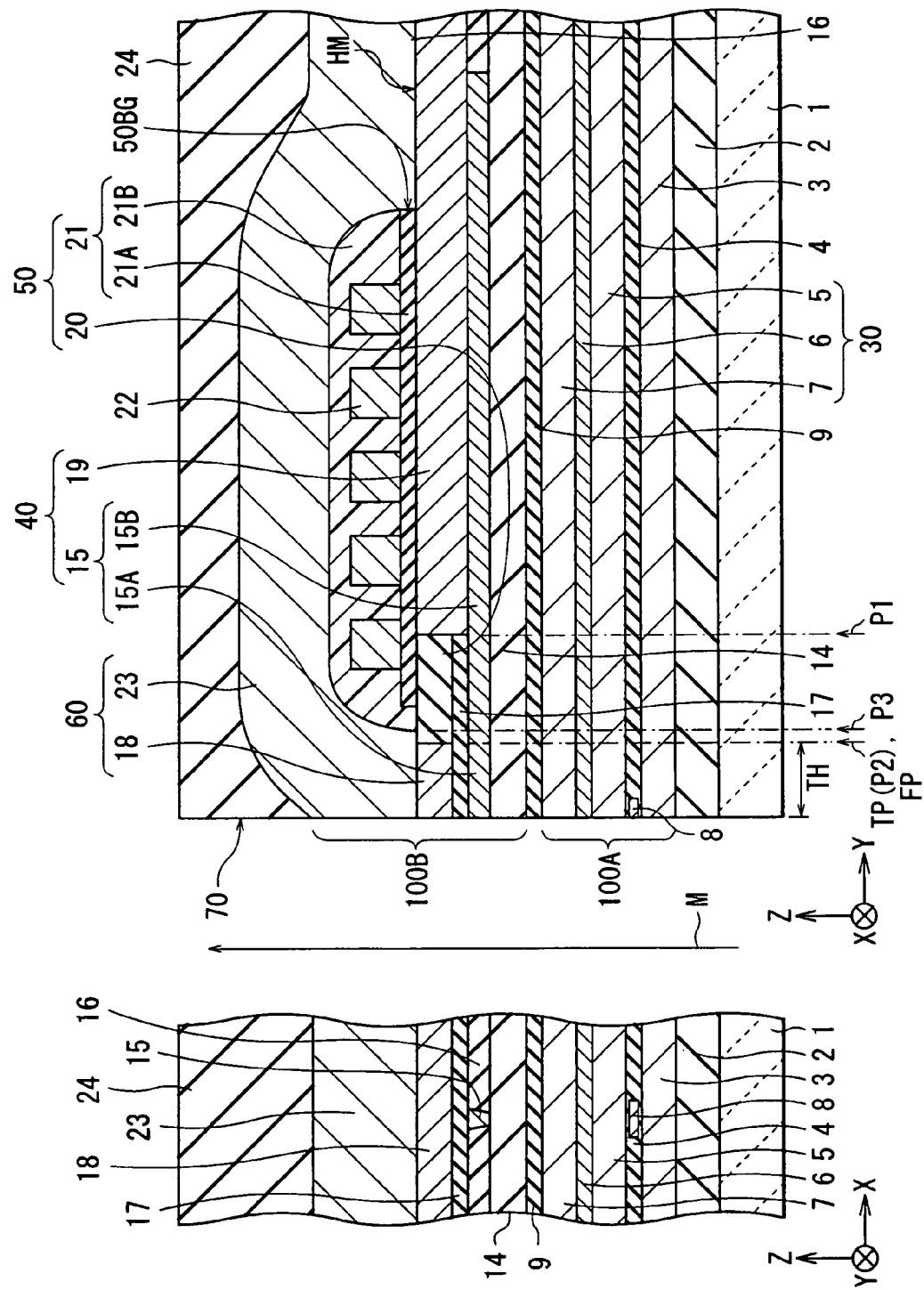
FIGS. 31A and 31B are sectional views of a modification of the thin film magnetic head according to the embodiment of the invention.

Although the invention is described referring to the embodiment and the example, the invention is not limited to the embodiment and the example, and can be variously modified. More specifically, for example, in the above embodiment, as shown in FIGS. 1A and 1B, the recording head portion 100B includes the thin film coil 22 which generates a magnetic flux for recording and the thin film coil 10 which generates a magnetic flux for leakage prevention; however, the invention is not specifically limited to this. As shown in FIGS. 31A and 31B, the recording head portion 100B may include only the thin film coil 22 without the thin film coil 10. The thin film magnetic head shown in FIGS. 31A and 31B has the same structure as the thin film magnetic head shown in FIGS. 1A and 1B, except that the recording head portion 100B has a structure in which the thin film coil 10 and the insulating layers 11 through 13 are not included, and the non-magnetic layer 14 is adjacent to the separating layer 9. The same effect as those in the embodiment can be obtained in this case.

Moreover, in the embodiment and the example, the case where the invention is applied to the composite thin film magnetic head is described; however, it is not necessarily limited to the case, and the invention can be applied to, for example, a thin film magnetic head for recording only including an inductive magnetic transducer for writing or a thin film magnetic head having an inductive magnetic transducer for recording/reproducing. In addition, the invention is applicable to a thin film magnetic head with a structure in which a device for writing and a device for reproducing are inversely laminated.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic recording head, comprising:
   a thin film coil generating a magnetic flux;
   a pole layer extending from an air bearing surface facing a recording medium to the rear, and guiding the magnetic flux to the recording medium so that the recording medium is magnetized in a direction orthogonal to a surface of the recording medium; and
   a magnetic layer extending from the air bearing surface to the rear on a trailing side of the pole layer, the magnetic layer being separated from the pole layer by a gap layer on a side closer to the air bearing surface, and being connected to the pole layer on a side further from the air bearing surface,
   wherein the pole layer includes:
   a main pole layer extending from the air bearing surface to the rear on a leading side; and
   an auxiliary pole layer extending from a position at the rear of the air bearing surface to the rear on a trailing side,
   in the pole layer, the main pole layer and the auxiliary pole layer are laminated, and
   the magnetic layer includes:
   a first magnetic layer portion being provided on the same level as the auxiliary pole layer in a direction in which the main pole layer and the auxiliary pole layer are laminated, being separated from the main pole layer by the gap layer, and extending from the air bearing surface to a position at the front of the auxiliary pole layer,
   a second magnetic layer portion extending from the air bearing surface to the rear on a trailing side of the first magnetic layer portion and the auxiliary pole layer, being connected to the first magnetic layer portion on a side closer to the air bearing surface, and being connected to the auxiliary pole layer on a side further from the air bearing surface, and
   in the magnetic layer, the first magnetic layer portion and the second magnetic layer portion are laminated.

2. The perpendicular magnetic recording head according to claim 1, wherein
   the saturated magnetic flux density of the auxiliary pole layer is smaller than the saturated magnetic flux density of the main pole layer.

3. The perpendicular magnetic recording head according to claim 1, wherein
   a distance from the air bearing surface to the auxiliary pole layer is within a range from 0.8 µm to 7.1 µm.

4. The perpendicular magnetic recording head according to claim 1, wherein
   the thickness of the gap layer is within a range from 0.03 µm to 0.1 µm.

5. The perpendicular magnetic recording head according to claim 1, wherein
   an exposed surface exposed to the air bearing surface of the main pole layer has a trapezoidal shape in which a long side positioned on a trailing side and a short side on a leading side are an upper base and a lower base, respectively.

6. The perpendicular magnetic recording head according to claim 1, wherein
   a surface on a trailing side of the first magnetic layer portion and a surface on a trailing side of the auxiliary pole layer are in the same plane.

7. The perpendicular magnetic recording head according to claim 1, further comprising:
   an insulating layer covering the thin film coil,
   wherein the insulating layer includes:
   a first insulating portion being filled between the first magnetic layer portion and the auxiliary pole layer, and determining a throat height in a position adjacent to the first magnetic layer portion; and a second insulating layer portion being disposed on a trailing side of the first insulating layer portion so as to cover the thin film coil.

8. The perpendicular magnetic recording head according to claim 7, wherein
the second insulating layer portion is positioned in the rear of the first insulating layer portion.

9. The perpendicular magnetic recording head according to claim 1, wherein
the maximum width of the exposed surface exposed to the air bearing surface of the magnetic layer in a recording track width direction is larger than the maximum width of the exposed surface exposed to the air bearing surface of the main pole layer in a recording track width direction.

10. The perpendicular magnetic recording head according to claim 1, wherein,
the width of the exposed surface exposed to the air bearing surface on a trailing side of the main pole layer in a recording track width direction is 0.2 μm or less, and the area of the exposed surface exposed to the air bearing surface of the magnetic layer is 7 μm$^2$ or more.

11. The perpendicular magnetic recording head according to claim 10, wherein,
a relationship of $Y \geq \{7X[9000 \times 10^3/(4\pi)]\} \times Z$ is established, where the saturated magnetic flux density of the magnetic layer is X [T(tesla)], the magnetic area of the exposed surface exposed to the air bearing surface of the magnetic layer is Y [μm$^2$T], and the maximum value of the strength of a magnetic field magnetizing the recording medium is $Z[\times 10^3/(4\pi)A/m]$.

12. A perpendicular magnetic recording head, comprising:
a thin film coil generating a magnetic flux;
a pole layer extending from an air bearing surface facing a recording medium to the rear, and guiding the magnetic flux to the recording medium so that the recording medium is magnetized in a direction orthogonal to a surface of the recording medium; and
a return yoke layer extending from the air bearing surface to the rear on a trailing side of the pole layer, and being connected to the pole layer on a side further from the air bearing surface; and
a write shield layer disposed in a region close to the air bearing surface between the pole layer and the return yoke layer so as to be separated from the pole layer by the gap layer,
wherein the pole layer includes:
a main pole layer extending from the air bearing surface to the rear on a leading side; and
an auxiliary pole layer extending from a position at the rear of the air bearing surface to the rear on a trailing side,
in the pole layer, the main pole layer and the auxiliary pole layer are laminated, and
the write shield layer is provided on the same level as the auxiliary pole layer in a direction in which the main pole layer and the auxiliary pole layer are laminated, and extends from the air bearing surface to a position at the front of the auxiliary pole layer.

13. The perpendicular magnetic recording head according to claim 12, wherein
the write shield layer is exposed to the air bearing surface, and is connected to the return yoke layer.

14. A method of manufacturing a thin film magnetic head, the thin film magnetic head including thin film coil, a pole layer and a magnetic layer, the thin film coil generating a magnetic flux, the pole layer extending from an air bearing surface facing a recording medium to the rear, and guiding the magnetic flux to the recording medium so that the recording medium is magnetized in a direction orthogonal to a surface of the recording medium, the magnetic layer extending from the air bearing surface to the rear on a trailing side of the pole layer, being separated from the pole layer by a gap layer on a side closer to the air bearing surface, and being connected to the pole layer on a side further from the air bearing surface,
wherein a step of forming the pole layer includes:
a first step of pattern-forming a main pole layer as a part of the pole layer so as to extend from the air bearing surface to the rear on a leading side;
a second step of pattern-forming an auxiliary pole layer as another part of the pole layer on the main pole layer so as to extend from a position at the rear of the air bearing surface to the rear on a trailing side, thereby forming the pole layer so that the main pole layer and the auxiliary pole layer are laminated, and
the magnetic layer includes:
a first magnetic layer portion being provided on the same level as the auxiliary pole layer in a direction in which the main pole layer and the auxiliary pole layer are laminated, being separated from the main pole layer by the gap layer, and extending from the air bearing surface to a position at the front of the auxiliary pole layer,
a second magnetic layer portion extending from the air bearing surface to the rear on a trailing side of the first magnetic layer portion and the auxiliary pole layer, being connected to the first magnetic layer portion on a side closer to the air bearing surface, and being connected to the auxiliary pole layer on a side further from the air bearing surface, and
in the magnetic layer, the first magnetic layer portion and the second magnetic layer portion are laminated.

15. A magnetic recording apparatus, comprising:
a recording medium; and
a perpendicular magnetic recording head recording information on the recording medium,
wherein the perpendicular magnetic recording head includes:
thin film coil generating a magnetic flux;
a pole layer extending from an air bearing surface facing a recording medium to the rear, and guiding the magnetic flux to the recording medium so that the recording medium is magnetized in a direction orthogonal to a surface of the recording medium; and
a magnetic layer extending from the air bearing surface to the rear on a trailing side of the pole layer, the magnetic layer being separated from the pole layer by a gap layer on a side closer to the air bearing surface, and being connected to the pole layer on a side further from the air bearing surface,
the pole layer includes:
a main pole layer extending from the air bearing surface to the rear on a leading side; and
an auxiliary pole layer extending from a position at the rear of the air bearing surface to the rear on a trailing side, and
in the pole layer, the main pole layer and the auxiliary pole layer are laminated, and
the magnetic layer includes:
a first magnetic layer portion being provided on the same level as the auxiliary pole layer in a direction in which the main pole layer and the auxiliary pole layer are laminated, being separated from the main pole layer by the gap layer, and extending from the air bearing surface to a position at the front of the auxiliary pole layer,
a second magnetic layer portion extending from the air bearing surface to the rear on a trailing side of the first magnetic layer portion and the auxiliary pole layer, being connected to the first magnetic layer portion on a side closer to the air bearing surface, and being connected to the auxiliary pole layer on a side further from the air bearing surface, and in the magnetic layer, the first magnetic layer portion and the second magnetic layer portion are laminated.

16. The magnetic recording apparatus according to claim 15, wherein the recording medium includes a magnetized layer and a soft magnetic layer which are laminated.

* * * * *